(12) United States Patent
Kurita et al.

(10) Patent No.: US 9,581,061 B2
(45) Date of Patent: Feb. 28, 2017

(54) INTERNAL COMBUSTION ENGINE AND SEPARATOR STRUCTURE THEREOF

(71) Applicant: AISIN SEIKI KABUSHIKI KAISHA, Kariya-shi (JP)

(72) Inventors: Hirotaka Kurita, Nagoya (JP); Yoshiyuki Kawai, Nagoya (JP); Seiichi Shiigi, Kariya (JP); Naoki Emori, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 136 days.

(21) Appl. No.: 14/518,557

(22) Filed: Oct. 20, 2014

(65) Prior Publication Data
US 2015/0114368 A1    Apr. 30, 2015

(30) Foreign Application Priority Data

Oct. 28, 2013 (JP) ................. 2013-222925
Nov. 7, 2013 (JP) ................. 2013-230771
Mar. 14, 2014 (JP) ................. 2014-051495

(51) Int. Cl.
  *F01M 13/04*    (2006.01)
  *F02B 77/11*    (2006.01)
  (Continued)

(52) U.S. Cl.
  CPC ............. *F01M 13/04* (2013.01); *F01P 5/12* (2013.01); *F02B 67/00* (2013.01); *F02B 67/04* (2013.01);
  (Continued)

(58) Field of Classification Search
  CPC .......... F01M 13/04; F01M 2013/0438; F01M 2013/0422; F01M 13/00; F01M 2013/0461; F01M 2011/0033
  (Continued)

(56) References Cited

U.S. PATENT DOCUMENTS 4,583,367 A    4/1986 Kapfer et al.
6,415,778 B1   7/2002 Makino et al.
(Continued)

FOREIGN PATENT DOCUMENTS

EP    1130225 A1    9/2001
GB    2151706 A     7/1985
(Continued)

OTHER PUBLICATIONS

Extended European Search Report issued on Jan. 28, 2015, by the European Patent Office in corresponding European Application No. 14188962.6-1603 (5 pages).

*Primary Examiner* — Long T Tran
(74) *Attorney, Agent, or Firm* — Buchanan Ingersoll & Rooney PC

(57) ABSTRACT

An internal combustion engine includes a cylinder block, an auxiliary machinery attachment member arranged at a side wall of the cylinder block, the auxiliary machinery attachment member to which an auxiliary machine is attached, and a separator portion disposed in a void between the cylinder block and the auxiliary machinery attachment member, the separator portion being provided as a separate member from the cylinder block and the auxiliary machinery attachment member to perform gas-liquid separation on blow-by gas.

12 Claims, 9 Drawing Sheets

(51) Int. Cl.
   *F02B 67/04*     (2006.01)
   *F16N 13/04*     (2006.01)
   *F02B 67/00*     (2006.01)
   *F01P 5/12*      (2006.01)
   *F02F 7/00*      (2006.01)

(52) U.S. Cl.
   CPC ............ *F02B 77/11* (2013.01); *F02F 7/0068* (2013.01); *F16N 13/04* (2013.01); *F01M 2013/0461* (2013.01)

(58) Field of Classification Search
   USPC ............. 123/572, 573, 41.86, 73 AF, 198 C, 123/198 P, DIG. 5
   See application file for complete search history.

(56) References Cited

U.S. PATENT DOCUMENTS

| | | | |
|---|---|---|---|
| 6,425,451 B2 * | 7/2002 | Yoshida | F01M 13/04 123/572 |
| 6,568,378 B2 | 5/2003 | Baek | |
| 6,598,595 B2 * | 7/2003 | Yasui | F01M 13/04 123/572 |
| 2010/0126479 A1 * | 5/2010 | Shieh | F01M 13/04 123/573 |

FOREIGN PATENT DOCUMENTS

| | | |
|---|---|---|
| JP | 2-99212 U | 8/1990 |
| JP | 7-99088 B2 | 10/1995 |
| JP | 2003-041922 A | 2/2003 |
| JP | 3423649 B2 | 7/2003 |
| JP | 2013-160125 A | 8/2013 |

\* cited by examiner

INTERNAL COMBUSTION ENGINE AND SEPARATOR STRUCTURE THEREOF

CROSS REFERENCE TO RELATED APPLICATIONS

This application is based on and claims priority under 35 U.S.C. §119 to Japanese Patent Application 2013-222925, filed on Oct. 28, 2013, Japanese Patent Application 2013-230771, filed on Nov. 7, 2013, and Japanese Patent Application 2014-051495, filed on Mar. 14, 2014, the entire contents of which are incorporated herein by reference.

TECHNICAL FIELD

This disclosure generally relates to an internal combustion engine and a separator structure of the internal combustion engine.

BACKGROUND DISCUSSION

A known internal combustion engine disclosed, for example, in JP3423649B which will be hereinafter referred to as Reference 1 includes a separator portion for performing a gas-liquid separation on blow-by gas.

The internal combustion engine disclosed in Reference 1 includes a metallic cylinder block, a metallic auxiliary machinery bracket (an auxiliary machinery attachment member) to which auxiliary machines are attached, and a breather chamber (separator portion). In a state where the auxiliary machinery bracket is fixed to a side wall of the cylinder block, a void portion including an inner wall in a predetermined protruding and recessed form is formed between the side wall of the cylinder block in a recess form and a surface of an attachment portion of the auxiliary machinery bracket in a recess form, the side wall of the cylinder block and the surface of the auxiliary machinery bracket facing each other. The void portion is called the breather chamber to function as the separator portion for separating oil for recovery from blow-by gas that is leaked to a crank chamber from a lower portion of a cylinder. In addition, a portion of a coolant flow passage for cooling the internal combustion engine penetrates through the breather chamber across a conduit wall. Accordingly, heat of coolant warmed or heated by the internal combustion engine is transmitted to the breather chamber to thereby warm or heat the breather chamber (void portion). Water vapor in blow-by gas flowing within the breather chamber is thus inhibited from being condensed.

Nevertheless, according to the aforementioned configuration of the breather chamber in the internal combustion engine disclosed in Reference 1, because the breather chamber (separator portion) is formed by the side wall of the cylinder block in a recess form and the surface of the auxiliary machinery bracket in a recess form facing each other, the inside of the breather chamber is likely to be influenced by an outside air temperature. Specifically, in a case where outside air temperature is low and engine coolant temperature is low at the time of start of the internal combustion engine, for example, the metallic cylinder block and/or the metallic auxiliary machinery bracket are cooled, so that the breather chamber (separator portion) and the inside thereof are inhibited from being easily warmed or heated. Accordingly, immediately after the start of the internal combustion engine, water vapor in blow-by gas flowing within the breather chamber in a cold state appears as dew condensation water that may be easily mixed in oil obtained by the gas-liquid separation within the breather chamber.

A need thus exists for an internal combustion engine and a separator structure of the internal combustion engine which are not susceptible to the drawback mentioned above.

SUMMARY

According to an aspect of this disclosure, an internal combustion engine includes a cylinder block, an auxiliary machinery attachment member arranged at a side wall of the cylinder block, the auxiliary machinery attachment member to which an auxiliary machine is attached, and a separator portion disposed in a void between the cylinder block and the auxiliary machinery attachment member, the separator portion being provided as a separate member from the cylinder block and the auxiliary machinery attachment member to perform gas-liquid separation on blow-by gas.

According to another aspect of this disclosure, a separator structure of an internal combustion engine includes a separator portion disposed in a void between a cylinder block and an auxiliary machinery attachment member which is arranged at a side surface of the cylinder block and to which an auxiliary machine is attached, the separator portion being provided as a separate member from the cylinder block and the auxiliary machinery attachment member to perform gas-liquid separation on blow-by gas.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments disclosed here will be explained with reference to the attached drawings.

Figure 1:
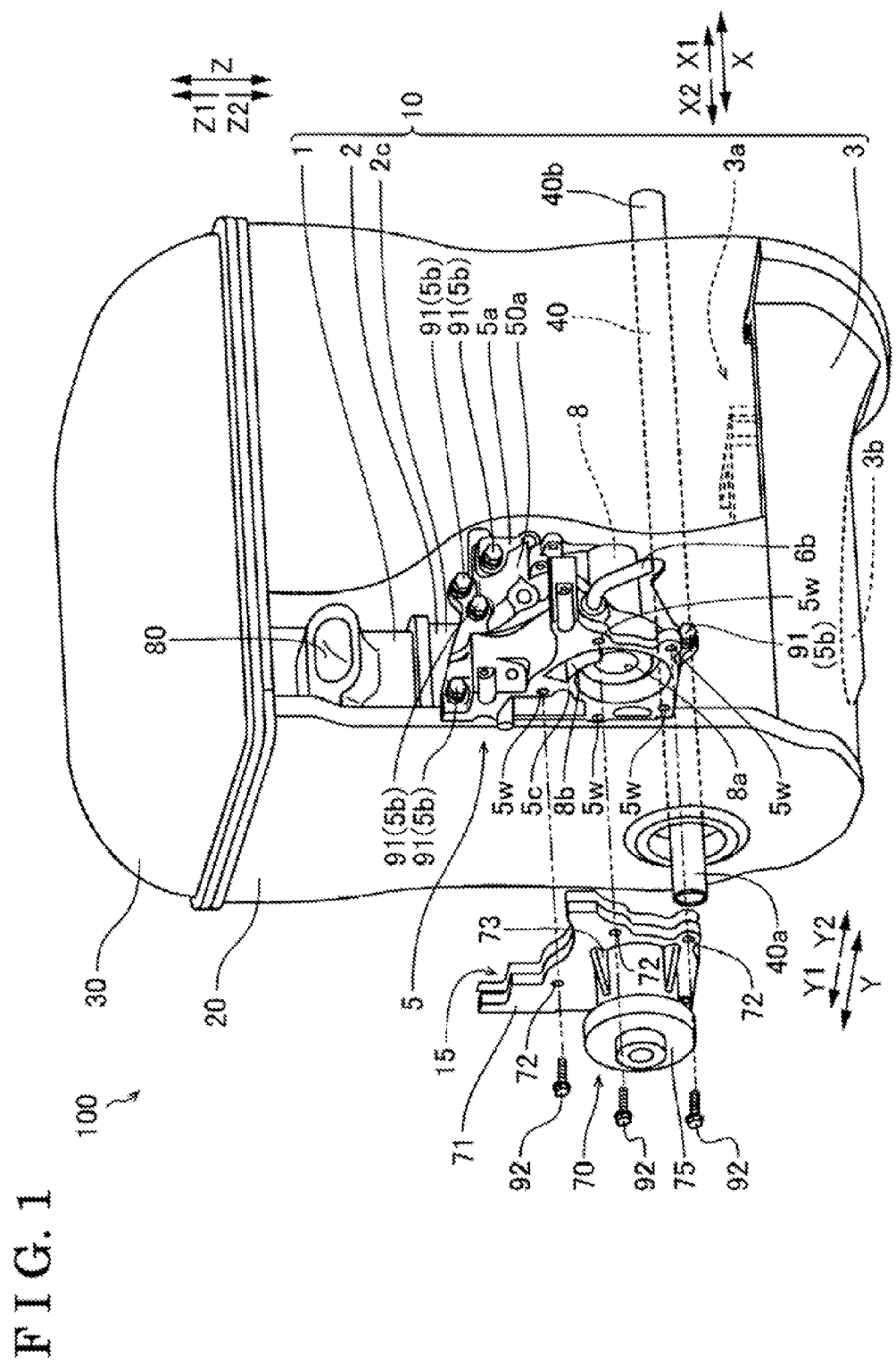
FIG. 1 is a perspective view illustrating an entire configuration of an engine according to a first embodiment disclosed here.
Figure 2:
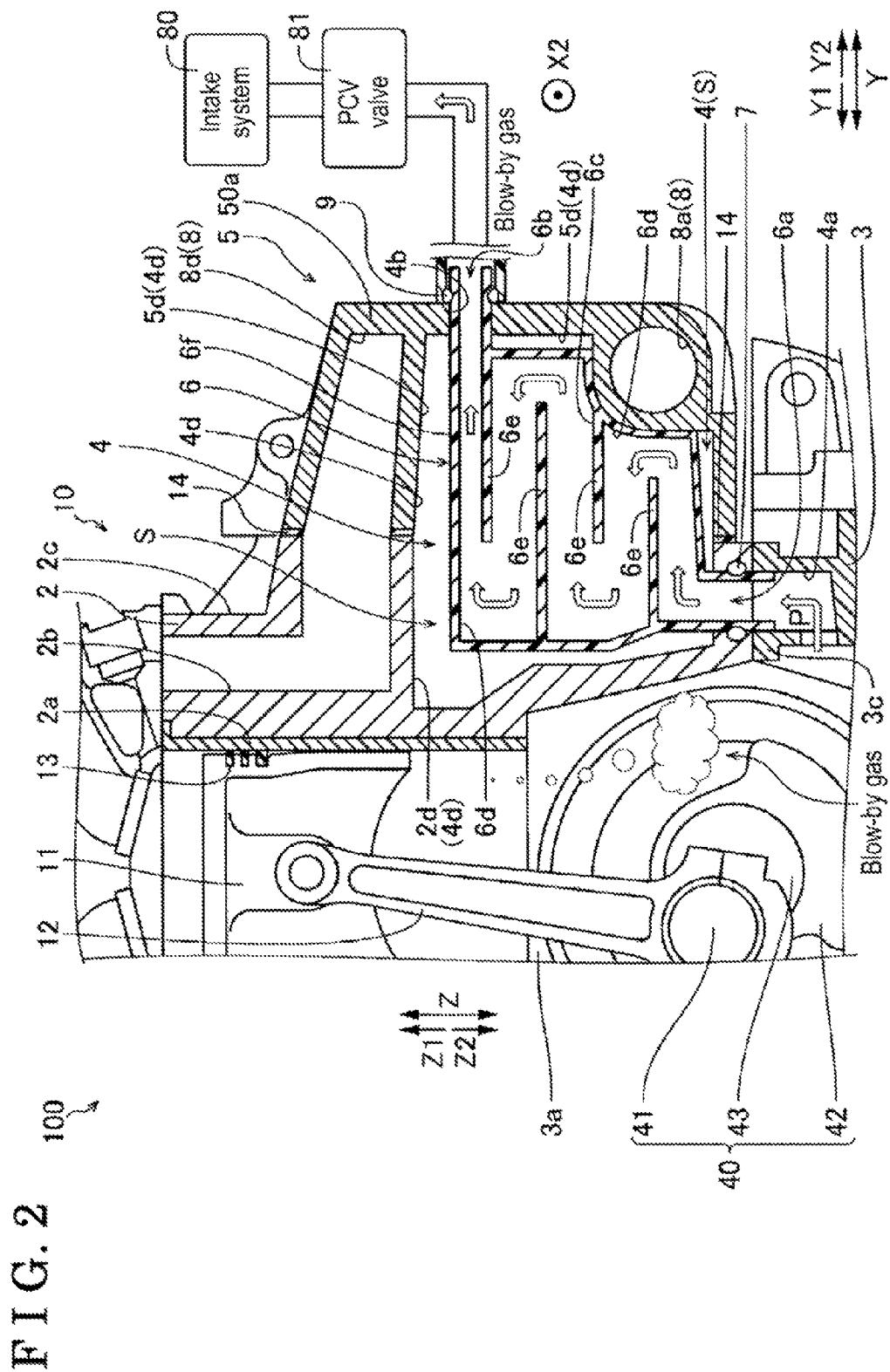
FIG. 2 is a cross-sectional view illustrating an inner structure of a separator portion in the engine viewed from a front side towards a rear side according to the first embodiment.
Figure 3:
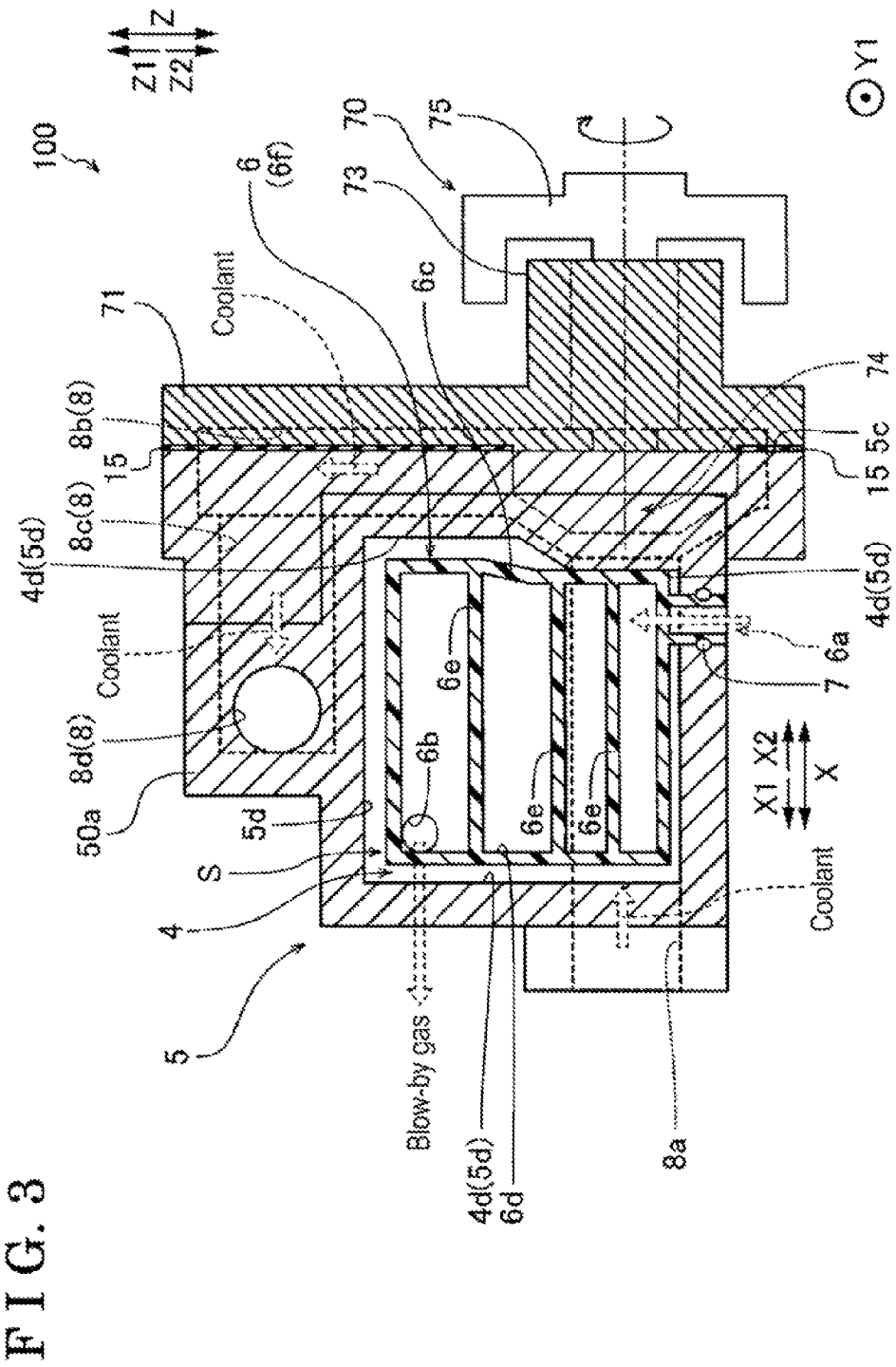
FIG. 3 is a diagram illustrating the inner structure of the separator portion in the engine viewed from a side where an auxiliary machinery bracket is attached to a side wall of a cylinder block according to the first embodiment.

First, an engine 100 according to a first embodiment will be explained with reference to FIGS. 1 to 3. In FIG. 1, main components of the engine 100 are illustrated. In FIGS. 2 and 3, detailed structures around a cylinder block 2 and an auxiliary machinery bracket 5 are illustrated. In the following explanations, a direction in which a crankshaft 40 extends corresponds to a direction X, a direction orthogonal to the extending direction of the crankshaft 40 corresponds to a direction Y, and a direction in which a cylinder 2a extends corresponds to a direction Z (i.e., in an up-down direction).

As illustrated in FIG. 1, the engine 100 for an automobile, for example, includes an engine body 10 made of aluminum alloy, for example, and including a cylinder head 1, the cylinder block 2 and a crankcase 3. The engine 100 formed by a gasoline engine includes a chain cover 20 assembled on an end portion of the engine body 10 at a side X2 and a head cover 30 assembled on an upper side (i.e., at a side Z1) of the cylinder head 1. The engine 100 serves as an example of an internal combustion engine.

A camshaft and a valve mechanism, for example, are accommodated within the cylinder head 1. As illustrated in FIGS. 1 and 2, the cylinder 2a within which a piston 11 moves in a reciprocation manner in the direction Z and a water jacket 2b are formed at an inner portion of the cylinder block 2 that is connected to a lower portion (i.e., at a side Z2) of the cylinder head 1. The water jacket 2b through which coolant (i.e., cooling fluid or antifreeze fluid, for example) flows for cooling the cylinder 2a is formed to surround the cylinder 2a across a partition wall. An intake system is connected to one side (i.e., a side Y2) of the cylinder head 1 for introducing air to each of the plural cylinders 2a formed at the cylinder block 2.

The cylinder block 2 and the crankcase 3 that is connected to a lower portion (i.e., at the side Z2) of the cylinder block 2 form a crank chamber 3a at an inner bottom portion of the engine body 10. The crankshaft 40 is arranged at the crank chamber 3a to be rotatably connected about an axis X via the piston 11 and a con rod 12. In FIG. 1, the crankshaft 40 is illustrated in a substantially bar form. In fact, however, the crankshaft 40 is configured to include a crank pin 41 of which a rotation axis is eccentrically specified, a balance weight 42 pinching the crank pin 41 in an axial direction, and a crank journal 43 in a state where the crank pin 41 and the balance weight 42 are connected to the crank journal 43 at a position directly below each of the cylinders 2a. In addition, an oil storage portion 3b is disposed at a lower portion (i.e., at the side Z2) of the crank chamber 3a for storing engine oil (which will be hereinafter simply referred to as oil). Oil is suctioned by an oil pump from the oil storage portion 3b towards an upper portion of the engine body 10 to lubricate a valve system timing member such as a camshaft, for example, and an outer peripheral surface of the piston 11 serving as a sliding portion, for example, and thereafter is returned to the oil storage portion 3b by falling by its own weight of oil.

As illustrated in FIG. 1, the engine 100 includes the auxiliary machinery bracket 5 made of aluminum alloy, for example. The auxiliary machinery bracket 5 includes a body portion 50a, a cylinder block attachment portion 5a and a water pump attachment portion 5c. The cylinder block attachment portion 5a includes plural fixation bores (i.e., penetration bores) 5b formed at an outer edge portion of the body portion 50a. The water pump attachment portion 5c includes plural fixation holes 5w which serve as screw holes, for example, and via which a water pump 70 for coolant circulation serving as an accessory or an auxiliary machine for the engine 100 is fixed. The cylinder block attachment portion 5a arranged on a plane X-Z and the water pump attachment portion 5c arranged on a plane Y-Z are orthogonal to each other. The auxiliary machinery bracket 5 serves as an example of an auxiliary machinery attachment member. The water pump 70 serves as an example of an auxiliary machine.

The auxiliary machinery bracket 5 is assembled on a predetermined position of a side wall 2c of the cylinder block 2 via a seal member 14 by bolts 91 which are inserted to the respective fixation bores 5b to be fastened to the cylinder block 2 in a state where the cylinder block attachment portion 5a faces the cylinder block 2. The water pump 70 includes an attachment portion 71 at which plural attachment bores (i.e., penetration bores) 72 are formed. The water pump 70 is assembled on the water pump attachment portion 5c via a seal member 15 such as a metal gasket, for example, by bolts 92 which are inserted to the respective attachment bores 72 at the attachment portion 71 to be fastened to the fixation holes 5w formed at the water pump attachment portion 5c of the auxiliary machinery bracket 5. As illustrated in FIG. 3, the water pump 70 includes an impeller 74 that is configured to be rotatable within a housing 73. In a case where a pulley 75 provided at the outside of the housing 73 rotates in a predetermined direction, the impeller 74 rotates to exert a pumping function. The auxiliary machinery bracket 5 is also used to secure other auxiliary machines besides the water pump 70, for example, an alternator (power generating equipment) and a compressor for air conditioning, to a side portion of the engine body 10 at the side Y2 in FIG. 2.

The side wall 2c of the cylinder block 2 includes a recess portion 2d recessed in a surface at the side Y2. The cylinder block attachment portion 5a of the auxiliary machinery bracket 5 includes a recess portion 5d recessed in a surface at a side Y1 facing the side wall 2c. The auxiliary machinery bracket 5 is configured to be assembled on the cylinder block 2 in a state where the recess portion 5d of the cylinder block attachment portion 5a faces the recess portion 2d of the side wall 2c so that outer edge portions of the cylinder block attachment portion 5a and the side wall 2c are opposed to each other. The seal member 14 such as a metal gasket, for example, is disposed at a mating face between the cylinder block 2 and the auxiliary machinery bracket 5.

In the first embodiment, as illustrated in FIG. 2, a void portion 4 in a predetermined form is defined between the recess portion 2d of the side wall 2c and the recess portion 5d of the cylinder block attachment portion 5a in a state where the auxiliary machinery bracket 5 is assembled on the cylinder block 2. Then, a separator portion 6 (separator structure) formed by a separate member (an individual member) from the cylinder block 2 and the auxiliary machinery bracket 5 is fitted in the void portion 4. The separator portion 6 includes a function to perform gas-liquid separation on blow-by gas. The void portion 4 serves as an example of a void.

The separator portion 6 made of resin, for example, includes an inlet portion 6a formed at a lower portion (i.e., at the side Z2), an outlet portion 6b formed at an upper portion (i.e., at the side Z1), and a body portion 6c formed between the inlet portion 6a and the outlet portion 6b to include a hollow configuration. The body portion 6c includes an inner wall surface 6d with a complex configuration by including protrusions and recesses. In view of manufacturing process, the body portion 6c is obtained from two divided parts in the up-down direction or right-left direction which are integrated by vibration welding, for example, to achieve the separator portion 6 as a single member. In a state where the auxiliary machinery bracket 5 is assembled on the cylinder block 2, a first penetration portion 4a and a second penetration portion 4b are formed in the void portion 4. The first penetration portion 4a penetrates in an L-shape through a side wall portion 3c formed at an upper portion of the crankcase 3 and a lower portion of the side wall 2c of the cylinder block 2. The second penetration portion 4b penetrates through the cylinder block attachment portion 5a of the auxiliary machinery bracket 5 from a side where the recess portion 5d is provided towards the outside of the auxiliary machinery bracket 5 along a direction Y2. The separator portion 6 is accommodated in the void portion 4 in a state where the inlet portion 6a is inserted to a portion of the first penetration portion 4a extending in the direction Z while the outlet portion 6b is inserted to the second penetration portion 4b extending in the direction Y. The inlet portion 6a serves as an example of an inlet port.

In the first embodiment, in a state where the separator portion 6 is arranged within the void portion 4, a clearance S formed by an air layer is defined between an outer surface 6f of the body portion 6c and an inner wall surface 4d of the void portion 4. The clearance S is formed at least in a way that the outer surface 6f of the body portion 6c is apart from an inner wall surface of the recess portion 5d of the auxiliary machinery bracket 5 (i.e., the inner wall surface 4d of the void portion 4) to an inner side of the void portion 4. In addition, the clearance S extends, at an upper side of the body portion 6c, from a portion of the cylinder block 2 facing the recess portion 5d towards the recess portion 2d. Accordingly, the outer surface 6f of the body portion 6c facing a downward-facing inner wall surface of the recess portion 2d of the cylinder block 2 (i.e., the inner wall surface 4d of the void portion 4) is apart from the recess portion 2d by the clearance S to the inner side of the void portion 4 (i.e., in a downward direction). The clearance S also extends, at a lower side of the body portion 6c, from the recess portion 5d of the auxiliary machinery bracket 5 towards the recess portion 2d of the cylinder block 2. Accordingly, the outer surface 6f of the body portion 6c facing an upward-facing inner wall surface of the recess portion 2d of the cylinder block 2 (i.e., the inner wall surface 4d of the void portion 4) is apart from the recess portion 2d by the clearance S to the inner side of the void portion 4 (i.e., in an upward direction).

As illustrated in FIG. 3, the body portion 6c is configured so that the outer surface 6f is arranged apart from the inner wall surface 4d forming an end portion of the void portion 4 at the side X2 by the clearance S to the inner side and apart from the inner wall surface 4d forming an end portion of the void portion 4 at the side X1 by the clearance S to the inner side. Accordingly, as illustrated in FIGS. 2 and 3, in the void portion 4, the separator portion 6 including a steric configuration is formed so that the outer surface 6f is surrounded and covered by the clearance S formed by the air layer, except for the first and second penetration portions 4a, 4b and a portion in contact with a first passage portion 8a of a coolant flow passage 8 which will be explained later. Because a temperature of the auxiliary machinery bracket 5 or the cylinder block 2, for example, is inhibited from being directly transmitted to the body portion 6c of the separator portion 6, heat retaining properties of the separator portion 6 are secured.

As illustrated in FIG. 2, a seal member 7 is provided for sealing the clearance S between a portion in the vicinity of the inlet portion 6a of the separator portion 6 and the cylinder block 2. The seal member 7 is made of a material including elasticity or resiliency and also including both water resistance and oil resistance, i.e., made of a rubber (resin) material, for example. Therefore, atmosphere including water and oil, specifically, blow-by gas and oil mist, at the crankcase 3 is inhibited from entering the clearance S between the void portion 4 and the outer surface 6f of the body portion 6c from the first penetration portion 4a. On the other hand, a seal member is not provided between a portion in the vicinity of the outlet portion 6b of the separator portion 6 and the second penetration portion 4b of the auxiliary machinery bracket 5. The outlet portion 6b of the separator portion 6 and a conduit (a hose member) connecting the outlet portion 6b and a positive crankcase ventilation (PCV) valve 81 are connected to each other via a seal member 9 so that blow-by gas flowing through the outlet portion 6b is inhibited from being leaked to the outside.

The engine 100 is configured in a way that blow-by gas (i.e., unburnt air-fuel mixture) being leaked to the crankcase 3 (specifically, the crank chamber 3a) provided at a lower side of the cylinder 2a from a clearance between an inner wall surface of the cylinder (cylinder liner) 2a and a piston ring 13 is again introduced to an intake system 80 that sends air to the cylinder 2a. Specifically, in the engine body 10, a flow passage for blow-by gas (blow-by gas flow passage) is formed to connect the crankcase 3 and the PCV valve 81 that is connected to the intake system 80. The separator portion 6 constitutes a portion of the blow-by gas flow passage. In this case, the crankcase 3 and the separator portion 6 are connected by the inlet portion 6a while the PCV valve 81 and the separator portion 6 are connected by the outlet portion 6b.

The inner wall surface 6d of the body portion 6c includes plural projecting wall portions (in the embodiment, four projecting wall portions) 6e each of which includes a plate form. The projecting wall portions 6e extend on a horizontal surface (i.e., a plane X-Y). Specifically, the projecting wall portions 6e project from the inner wall surface 6d at the side Y1 and from the inner wall surface 6d at the side Y2 alternately along a horizontal direction (i.e., in directions Y1 and Y2). Tip end portions of the projecting wall portions 6e overlap each other at a substantially center portion of the body portion 6c in the direction Y in a state to be apart from one another by predetermined intervals in the direction Z. Accordingly, the separator portion 6 forms a labyrinth structure at an inner portion. Blow-by gas leaked to the crankcase 3 (the crank chamber 3a) flows through the separator portion 6 that includes the labyrinth structure (labyrinth system) from the lower portion corresponding to the inlet portion 6a to the upper portion corresponding to the outlet portion 6b to be introduced to the PCV valve 81 and thereafter to be led to the intake system 80.

Blow-by gas containing hydrocarbon is mixed with oil mist that is generated at the crank chamber 3a. Thus, as illustrated in FIG. 2, in a case where blow-by gas passes through the separator portion 6, oil mist in fine particle form is effectively collected from blow-by gas that stays at an inner void of the separator portion 6 of which a flow passage length from the inlet portion 6a to the outlet portion 6b is elongated in a reciprocating meander form by the inner wall surface 6*d* including the plural projecting wall portions 6*e*. In addition, by a usage of inertial collision of blow-by gas against the inner wall surface 6*d* of the body portion 6*c* in a complex form by including protrusions and recesses (i.e., the projecting wall portions 6*e*), oil is separated from blow-by gas by the gas-liquid separation. Then, oil in liquid drop resulting from the gas-liquid separation is naturally dropped to the crankcase 3 (the oil storage portion 3*b*) from the inlet portion 6*a* (the first penetration portion 4*a*) formed at the lower portion of the separator portion 6.

Blow-by gas that is leaked to the crankcase 3 (the crank chamber 3*a*) flows into the separator portion 6 via the inlet portion 6*a* at the lower portion as illustrated by an arrow P to be repeatedly collided against the inner wall surface 6*d* (the projecting wall portions 6*e*) while remaining and staying in the body portion 6*c*. Then, the aforementioned blow-by gas is discharged towards the PCV valve 81 from the outlet portion 6*b*. The blow-by gas in which oil is separated by the gas-liquid separation is guided by the PCV valve 81 to flow back to the intake system 80.

In a state where the auxiliary machinery bracket 5 is assembled on the cylinder block 2, the coolant flow passage 8 including a predetermined layout is configured to be formed at the engine body 10.

As illustrated in FIGS. 2 and 3, the coolant flow passage 8 includes the first passage portion 8*a* extending in the direction X2 within the auxiliary machinery bracket 5, a second passage portion 8*b* extending obliquely upwardly (i.e., substantially in the arrow Z1 direction) within the auxiliary machinery bracket 5, a third passage portion 8*c* connected to the second passage portion 8*b* to extend in the direction X1 within the auxiliary machinery bracket 5, and a fourth passage portion 8*d* connected to the third passage portion 8*c* to extend in the direction Y within the auxiliary machinery bracket 5 and the cylinder block 2. In this case, the first passage portion 8*a*, the water pump 70, the second passage portion 8*b*, the third passage portion 8*c* and the fourth passage portion 8*d* are connected in the mentioned order in the coolant flow passage 8 along a flow direction of coolant (i.e., cooling fluid or antifreeze fluid, for example). As illustrated in FIG. 2, the fourth passage portion 8*d* is connected to the vicinity of a lower end portion of the water jacket 2*b* at the inner portion of the cylinder block 2. The fourth passage portion 8*d* also serves as a portion of the water jacket 2*b*. The first passage portion 8*a* serves as an example of a coolant flow passage. The coolant flow passage is not only a passage through which coolant formed by normal water flows but also a passage through which coolant formed by antifreeze fluid (cooling fluid) including antifreezing agent or rust-preventive agent and corrosion prevention agent, for example, for inhibiting corrosion of a metal component.

A flow of coolant (cooling fluid) will be explained. In a case where the engine 100 (see FIG. 1) is steadily driven, coolant (cooling fluid) cooled by a radiator flows in the arrow X2 direction through the first passage portion 8*a* provided within the auxiliary machinery bracket 5 and connected to a conduit (a hose member) that extends from the radiator so that the coolant is suctioned into the water pump 70. The coolant discharged from the water pump 70 flows through the second passage portion 8*b* within the auxiliary machinery bracket 5 in the obliquely upward direction (i.e., substantially in the arrow Z1 direction) and thereafter flows through the third passage portion 8*c* in the arrow X1 direction. Further, the coolant flows through the fourth passage portion 8*d* in the arrow Y1 direction to flow into the water jacket 2*b*. The coolant that receives heat from the cylinder head 1 and the cylinder block 2 is discharged from the cylinder head 1 and is returned to the radiator for cooling. Accordingly, the coolant flow passage 8 formed by the first to fourth passage portions 8*a*, 8*b*, 8*c*, and 8*d* serves as a portion of flow passage for cooling the cylinder head 1 and the cylinder block 2 in a case where the engine 100 is steadily driven.

The coolant flow passage 8 within the auxiliary machinery bracket 5 also functions to warm up or heat the inside of the separator portion 6 that is internally disposed at the engine body 10 by using heat of coolant warmed or heated by the engine 100 immediately after the start of the engine 100. In this case, a flow passage switching valve is driven so that coolant discharged from the cylinder head 1 and the cylinder block 2 flows back to the first passage portion 8*a* within the auxiliary machinery bracket 5 without passing through the radiator, i.e., without being cooled. Accordingly, immediately after the start of the engine 100, the inside of the separator portion 6 is heated by the effective usage of heat of coolant that is heated by the engine 100. In association with heating of the inside of the separator portion 6, blow-by gas generated immediately after the start of the engine 100 to pass through the separator portion 6 is heated. Water vapor component contained in blow-by gas is restrained from being condensed at a cooled portion of the inner wall surface 6*d* of the body portion 6*c*.

In the first embodiment, the first passage portion 8*a* for heating the separator portion 6 is arranged along the outer surface 6*f* of the body portion 6*c* so as to be positioned closer to the outer side of the separator portion 6. In this case, a conduit wall portion of the first passage portion 8*a* at the auxiliary machinery bracket 5 and a portion of the outer surface 6*f* of the body portion 6*c* are in contact with each other. In addition, the first passage portion 8*a* is arranged closer to the lower portion (i.e., the side Z2) of the body portion 6*c* where the inlet portion 6*a* is provided. That is, the first passage portion 8*a*, through which coolant at a relatively high temperature flows immediately after heated by the engine 100, is arranged at the lower portion of the separator portion 6. Thus, water vapor contained in blow-by gas immediately after flowing from the inlet portion 6*a* may be inhibited from being condensed.

At the inside of the chain cover 20 as illustrated in FIG. 1, a crankshaft timing sprocket attached to the crankshaft 40 and a camshaft timing sprocket for driving a camshaft assembled within the cylinder head 1 are connected to each other by a timing chain. In addition, at the outside of the chain cover 20, a crank pulley is attached to a front end portion 40*a* of the crankshaft 40 to be rotatable. The auxiliary machines such as the water pump 70 and a compressor for air conditioning are driven by a belt attached to the crank pulley. A rear end portion 40*b* of the crankshaft 40 is connected to a power transmission portion formed by a transmission, or the like. The structures around the auxiliary machinery bracket 5 in the engine 100 are obtained in the aforementioned manner.

In the first embodiment, the following effects are obtained.

In the first embodiment, the separator portion 6 is arranged at the void portion 4 between the cylinder block 2 and the auxiliary machinery bracket 5 in a state to serve as the separate member (individual member) from the cylinder block 2 and the auxiliary machinery bracket 5. Thus, the separator portion 6 serving as the separate member (separate component) from the cylinder block 2 and the auxiliary machinery bracket 5 may be thermally isolated from the side wall 2*c* of the cylinder block 2 and the auxiliary machinery bracket 5 which are directly exposed to an outside air, by the clearance S functioning as a heat insulating layer between the separator portion 6 and each of the auxiliary machinery bracket 5 and the cylinder block 2. Because the separator portion 6 is thermally insulated from the cylinder block 2 and the auxiliary machinery bracket 5 by means of the clearance S as the heat insulating layer, the separator portion 6 is unlikely to be directly affected by the outside air temperature. Thus, in an environment of low outside air temperature after the stop of the engine 100 and in a case where the temperature of coolant that flows through the water jacket 2b is not sufficiently increased after (immediately after) the start of the engine 100, for example, the temperature of the separator portion 6 is restrained from decreasing. The heat retaining properties of the separator portion 6 are thus secured to effectively inhibit condensation of water vapor in blow-by gas flowing through the separator portion 6. As a result, dew condensation water may be inhibited from being mixed into oil that is recovered by the separator portion 6.

In addition, because the separator portion 6 is provided as the separate member from the cylinder block 2 and the auxiliary machinery bracket 5, the separator portion 6 including the labyrinth structure may be easily incorporated in the engine body 10 without consideration of which oil separation system is used for conducting the gas-liquid separation on blow-by gas. Depending on design specifications of the engine 100, oil collection ability required for the separator portion 6 (features of the separator portion 6 in view of design specifications) is different. Nevertheless, even in a case where the separator portion 6 includes a system other than the labyrinth system, i.e., includes any oil separation system such as an inertial collision system, a cyclone system, and a filter system, for example, which will be explained later, inhibition of dew condensation of water vapor in blow-by gas is effectively achieved by heat-retention of the separator portion, thereby avoiding dew condensation water from being mixed into oil separated and obtained by the gas-liquid separation. Thus, high usefulness of the engine 100 is obtained.

In the first embodiment, the separator portion 6 is disposed in the void portion 4 formed between the cylinder block 2 and the auxiliary machinery bracket 5 while the clearance S is provided relative to at least the auxiliary machinery bracket 5. That is, the separator portion 6 is arranged in the void portion 4 in a state to have the clearance S relative to the auxiliary machinery bracket 5 that does not include a heat source or the like and that may easily directly receive an influence of outside air temperature. Thus, even in a state where the auxiliary machinery bracket 5 is cooled by the outside air, the clearance S functions as the heat insulating layer to inhibit the temperature of the auxiliary machinery bracket 5 from being directly thermally transmitted to the separator portion 6 in the void portion 4. Because the heat retaining properties of the separator portion 6 relative to the outside air temperature are effectively maintained, dew condensation of water vapor in blow-by gas that flows through the separator portion 6 resulting from the outside air temperature may be securely inhibited.

In addition, the separator portion 6 is disposed in the void portion 4 between the cylinder block 2 and the auxiliary machinery bracket 5 in a state where the clearance S is formed relative to both the auxiliary machinery bracket 5 and the cylinder block 2. That is, the separator portion 6 is arranged in a state to have the clearance S not only relative to the auxiliary machinery bracket 5 that is easily influenced by the outside air temperature but also relative to the cylinder block 2. Thus, even in a low-temperature state where the temperature of coolant flowing through the water jacket 2b is not heated to a predetermined temperature at the start of the engine 100, for example, a heat insulation effect (heat insulation ability) is obtained by the clearance S defined between the separator portion 6 and each of the auxiliary machinery bracket 5 and the cylinder block 2 to thereby secure heat-retention of the separation portion 6 in the void portion 4. Specifically, dew condensation of water vapor in blow-by gas flowing through the separator portion 6 immediately after cold start of the engine 100 may be securely inhibited.

Further, the clearance S between the separator portion 6 and at least the auxiliary machinery bracket 5 serves as the heat insulating layer formed by the air layer. Thus, even in a state where the auxiliary machinery bracket 5 is cooled, the heat insulation effect (heat insulation ability) is obtained relative to the auxiliary machinery bracket 5 to thereby securely maintain heat in the separator portion 6. In addition, because the heat insulating layer is formed by the air layer, the heat insulation ability may be easily exerted at the clearance S between the separator portion 6 and at least the auxiliary machinery bracket 5 without a usage of special material for exerting the heat insulation effect (heat insulation ability).

Furthermore, in the first embodiment, the separator portion 6 includes the labyrinth system so that the labyrinth structure is formed at the inner portion by the plural projecting wall portions 6e protruding from the inner wall surface 6d. Because of the labyrinth structure at the inner void of the separator portion 6, oil mist in fine particle form contained in blow-by gas may be effectively collected and captured by retention of blow-by gas at the inner void of the separator portion 6 where the flow passage length from the inlet portion 6a to the outlet portion 6b formed by the inner wall surface 6d (including the plural projecting wall portions 6e) is elongated in a reciprocating meander form. Oil mist may be also effectively collected and captured, in the process of flowing of blow-by gas, by repeated collisions of oil mist against the inner wall surface 6d (including the plural projecting wall portions 6e) in a complex form. In a case where the labyrinth type separator portion 6 is applied, blow-by gas is inhibited from being cooled by the inner wall surface 6d (including the plural projecting wall portions 6e) so as to effectively inhibit dew condensation of water vapor in blow-by gas flowing through the separator portion 6.

Furthermore, the separator portion 6 includes the inlet portion 6a that introduces blow-by gas from the cylinder block 2 and the seal member 7 that seals the clearance S between the portion in the vicinity of the inlet portion 6a of the separator portion 6 and the cylinder block 2. Accordingly, a portion of blow-by gas introduced to the separator portion 6 is inhibited from being leaked to (i.e., inhibited from entering) the clearance S (the air layer in the void portion 4) that outwardly surrounds the outer surface 6f of the separator portion 6 and that is formed between the outer surface 6f of the separator portion 6 and each of the cylinder block 2 and the auxiliary machinery bracket 5. As a result, oil in blow-by gas is inhibited from unnecessary entering to be retained in the clearance S.

Furthermore, the auxiliary machinery bracket 5 includes the coolant flow passage 8, and the separator portion 6 is disposed in the vicinity of the coolant flow passage 8 of the auxiliary machinery bracket 5. Accordingly, after the start of the engine 100, heat of coolant (high-temperature water) sufficiently heated by the engine 100 is transmitted to the inner void of the separator portion 6 to warm or heat the separation portion 6. After once the separator portion 6 is heated by heat of coolant, the heat retaining properties of the separator portion 6 disposed in the void portion 4 between the cylinder block 2 and the auxiliary machinery bracket 5 are secured. Thus, blow-by gas flowing through the separator portion 6 may be maintained at a predetermined temperature even in a case where the auxiliary machinery bracket 5 is exposed to a low-temperature outside air.

In the first embodiment, the separator portion 6 is made of resin. Thus, not only the clearance S between the separator portion 6 and each of the auxiliary machinery bracket 5 and the cylinder block 2 is used as the heat insulating layer but also the heat insulation effect (heat insulation ability) possessed by the separator portion 6 itself is used so that the separator portion 6 may be further unlikely to be influenced by the outside air temperature. In addition, two divided parts because of manufacturing process are united each other by vibration welding, for example, to thereby easily manufacture the separator portion 6 as a single member. In this case, an inner structure (i.e., the inner wall surface 6*d* including the plural projecting wall portions 6*e*) of each of the divided parts is formed in a desired form (i.e., labyrinth structure) by resin molding so that the separator portion 6 including heat retaining properties and high-performance oil separation function may be incorporated in the engine 100. Because of the resin-made separator portion 6, a weight reduction may be obtained.

Figure 4:
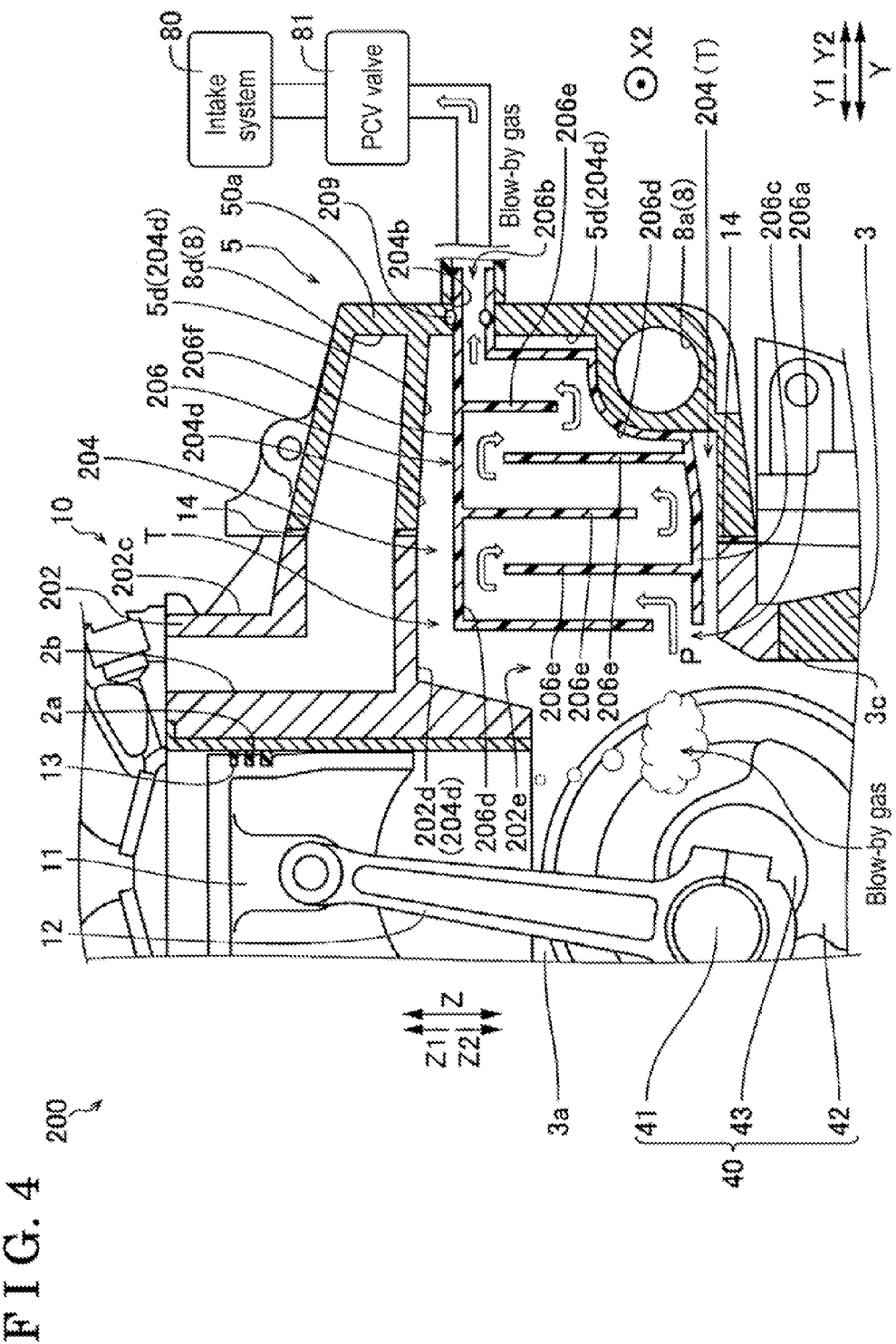
FIG. 4 is a cross-sectional view illustrating an inner structure of a separator portion in an engine viewed from a front side towards a rear side according to a second embodiment.

A second embodiment will be explained with reference to FIGS. 2 and 4. In the second embodiment, being different from the first embodiment, an outer surface 206*f* of a separator portion 206 is disposed to an inner portion of a cylinder block 202 (i.e., the crank chamber 3*a*). In FIG. 4, configurations of the second embodiment substantially similar to the first embodiment bear the same reference numerals as the first embodiment.

In an engine 200 according to the second embodiment, as illustrated in FIG. 4, the auxiliary machinery bracket 5 is assembled on a side wall 202*c* of the cylinder block 202 via the seal member 14. An opening portion 202*e* penetrating through the side wall 202*c* to the crank chamber 3*a* is formed at an inner wall portion 202*d* of the side wall 202*c* to which the auxiliary machinery bracket 5 is attached. At this time, the inner wall portion 202*d* constitutes a surface at an outer side of the cylinder block 202. Nevertheless, in view of constituting an inner wall surface 204*d* of a void portion 204 which will be explained later, the portion 202*d* is defined as the inner wall portion. The opening portion 202*e* of the inner wall portion 202*d* includes a relatively large opening area. The auxiliary machinery bracket 5 is assembled on the cylinder block 202 in a state where the recess portion 5*d* of the cylinder block attachment portion 5*a* faces the opening portion 202*e* (the inner wall portion 202*d*) of the side wall 202*c* so that outer edge portions of the cylinder block attachment portion 5*a* and the side wall 202*c* are in contact with each other. The engine 200 serves as an example of the internal combustion engine.

In the second embodiment, the void portion 204 in a predetermined form is defined between the inner wall portion 202*d* (the opening portion 202*e*) of the side wall 202*c* and the recess portion 5*d* of the cylinder block attachment portion 5*a* in a state where the auxiliary machinery bracket 5 is assembled on the cylinder block 202. The void portion 204 is in communication with the crank chamber 3*a* provided at the inner portion of the cylinder block 202. The separator portion 206 made of resin and serving as a separate member (individual member) from the cylinder block 202 and the auxiliary machinery bracket 5 is arranged in the void portion 204. The void portion 204 serves as an example of the void.

The separator portion 206 includes an inlet portion 206*a* formed at a lower portion, an outlet portion 206*b* formed at an upper portion, and a body portion 206*c*. The body portion 206*c* includes an inner wall surface 206*d* at an inner portion, the inner wall surface 206*d* including the labyrinth structure. In the separator portion 206, the inlet portion 206*a* is disposed to face the crank chamber 3*a* via the opening portion 202*e*, and the outlet portion 206*b* is fitted in the void portion 204 in a state to be inserted to a penetration bore 204*b*.

The outlet portion 206*b* of the separator portion 206 is fitted in the penetration bore 204*b* of the auxiliary machinery bracket 5 via a seal member 209. The seal member 209 is made of a material including elasticity or resiliency and also including oil resistance, i.e., made of a rubber (resin) material, for example. Therefore, because of the seal member 209, atmosphere including blow-by gas and oil mist, i.e., water and oil, at the crankcase 3 is inhibited from being leaked to the outside of the auxiliary machinery bracket 5 from the penetration bore 204*b*.

In the second embodiment, a clearance T formed by the air layer is also defined between the outer surface 206*f* of the body portion 206*c* and the inner wall surface 204*d* of the void portion 204 in a state where the separator portion 206 is disposed in the void portion 204. In this case, the clearance T is formed so that the outer surface 206*f* of the body portion 206*c* is apart from the inner wall surface of the recess portion 5*d* of the auxiliary machinery bracket 5 to an inner side of the void portion 204. In addition, the clearance T extends towards the opening portion 202*e* along the inner wall portion 202*d* of the cylinder block 202 from the recess portion 5*d* of the auxiliary machinery bracket 5 by following the outer surface 206*f* in the up-down direction (in the direction Z) and the front-rear direction (in the direction Z). The separator portion 206 including a steric structure is thus configured so that the outer surface 206*f* is surrounded and covered by the clearance T formed by the air layer, except for the penetration bore 204*b* and a portion in connection with the first passage portion 8*a* (the coolant flow passage 8).

In addition, in the second embodiment, the heat insulating layer formed by the air layer constituting the clearance T is in communication with the crank chamber 3*a* via the opening portion 202*e* of the cylinder block 202. Accordingly, after the start of the engine 200, blow-by gas at a high temperature that is leaked from the lower portion of the cylinder 2*a* towards the crank chamber 3*a* not only fills the crank chamber 3*a* but also fills the clearance T via the opening portion 202*e*. The separator portion 206 is surrounded by blow-by gas at a high temperature filled in the clearance T.

In a state where the separator portion 206 is surrounded by blow-by gas at a high temperature, blow-by gas flowing into the separator portion 206 from the inlet portion 206*a* as illustrated by the arrow P is repeatedly collided against the inner wall surface 206*d* (projecting wall portions 206*e*) while being retained within the body portion 206*c*. Thereafter, the blow-by gas is discharged from the outlet portion 206*b* towards the PCV valve 81.

The inner wall surface 206*d* of the body portion 206*c* includes the plural projecting wall portions (in the embodiment, four projecting wall portions) 206*e* each of which includes a plate form. In this case, each of the projecting wall portions 206*e* extends on a vertical surface (i.e., the plane X-Z). In addition, the projecting wall portions 206e project from the inner wall surface 206d at the side Z1 (upper surface) and from the inner wall surface 206d at the side Z2 (lower surface) alternately along the up-down direction (i.e., in the directions Z1 and Z2). Tip end portions of the projecting wall portions 206e overlap each other at a substantially center portion of the body portion 206c in the direction Z in a state to be apart from one another by predetermined intervals in the direction Y. Accordingly, the separator portion 206 forms the labyrinth structure at the inner portion.

In the second embodiment, the first passage portion 8a for warming or heating the separator portion 206 is arranged along the outer surface 206f of the body portion 206c to be positioned closer to the outer side of the separator portion 206. In this case, a conduit wall portion of the first passage portion 8a at the auxiliary machinery bracket 5 and a portion of the outer surface 206f of the body portion 206c are in contact with each other. In addition, the first passage portion 8a is arranged closer to the lower portion (i.e., the side Z2) of the body portion 206c where the inlet portion 206a is provided. The other configurations of the engine 200 in the second embodiment are substantially the same as the first embodiment.

In the second embodiment, the following effects are obtained.

In the second embodiment, the separator portion 206 is disposed in a state where the clearance T serving and constituting the heat insulating layer that includes the air layer is formed relative to both the auxiliary machinery bracket 5 and the cylinder block 202. Then, the opening portion 202e is formed at the inner wall portion 202d of the cylinder block 202 so that the heat insulating layer including the air layer is in communication with the crank chamber 3a serving as the inner portion of the cylinder block 202. Accordingly, the separator portion 206 arranged in the void portion 204 between the auxiliary machinery bracket 5 and the cylinder block 202 is surrounded by the heat insulating layer (air layer) in communication with (the inside of) the crank chamber 3a serving as the inner portion of the cylinder block 202. In this case, gas within the crank chamber 3a is warmed or heated by blow-by gas or engine oil that is stored at the oil storage portion 3b, for example, which results in generation of gas at a high temperature such as blow-by gas, for example. Thus, the separator portion 206 is surrounded by such gas at a high temperature. The heat retaining properties of the separator portion 206 may be easily secured after the start of the engine 200. The other effects of the second embodiment than the aforementioned effects are substantially the same as the first embodiment.

Figure 5:
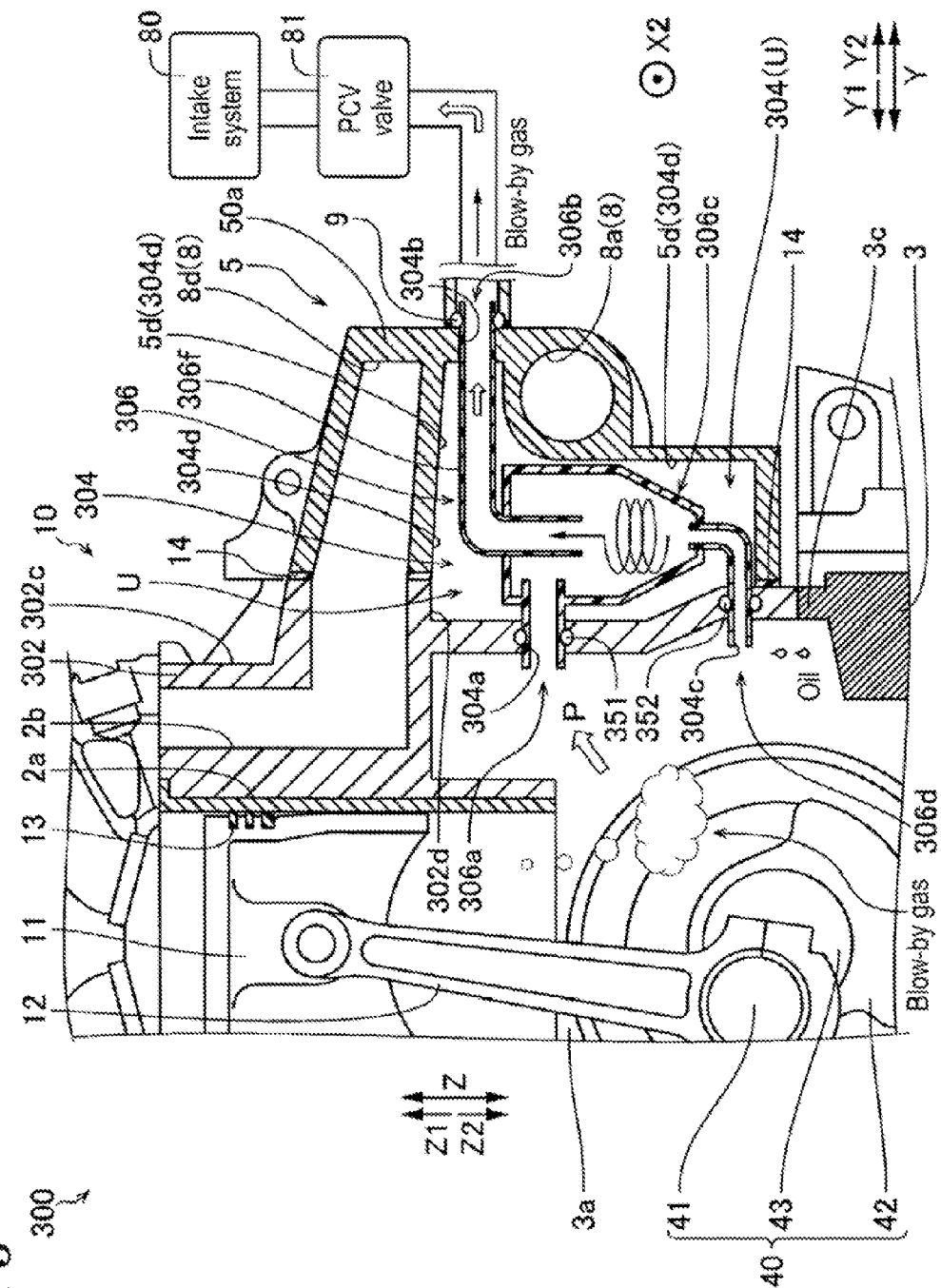
FIG. 5 is a cross-sectional view illustrating an inner structure of a separator portion in an engine viewed from a front side towards a rear side according to a third embodiment.

A third embodiment will be explained with reference to FIGS. 2 and 5. In the third embodiment, being different from the separator portion 6 including the labyrinth structure in the first embodiment (see FIG. 2), a separator portion 306 including a cyclone system as the oil separation system is applied. In FIG. 5, configurations of the third embodiment substantially similar to the first embodiment bear the same reference numerals as the first embodiment.

In an engine 300 according to the third embodiment, as illustrated in FIG. 5, the auxiliary machinery bracket 5 is assembled on a side wall 302c of a cylinder block 302. A void portion 304 in a predetermined form is defined between a recess portion 302d of the side wall 302c and the recess portion 5d of the cylinder block attachment portion 5a. Then, the separator portion 306 serving as a separate member (individual member) from the cylinder block 302 and the auxiliary machinery bracket 5 is arranged in the void portion 304 formed between the cylinder block 302 and the auxiliary machinery bracket 5. The void portion 304 serves as an example of the void. The engine 300 serves as an example of the internal combustion engine.

In the third embodiment, the cyclone-type separator portion 306 is applied. The separator portion 306 includes an inlet portion 306a formed at the side wall 302c, an outlet portion 306b formed at an upper portion (i.e., at the side Z1), a body portion 306c constituting a cyclone chamber formed between the inlet portion 306a and the outlet portion 306b, and an oil passage portion 306d to which oil that is separated from blow-by gas is dropped. According to the cyclone system, blow-by gas rotates or swirls at an inner portion of the body portion 306c constituting the cyclone chamber in a cylindrical form so as to separate oil mist contained in blow-by gas by centrifugal separation. In addition, according to the cyclone system, a method for collecting oil mist is different from the labyrinth system or the inertial collision system, for example. Thus, in association with a difference in collecting method of oil mist, a configuration of the separator portion 306 of the cyclone system is greatly different from a configuration of the separator portion 6 of the labyrinth system (inertial collision system). The inlet portion 306a serves as an example of the inlet port.

The void portion 304 includes a first penetration portion 304a penetrating through the recess portion 302d in the horizontal direction, a second penetration portion 304b penetrating through the cylinder block attachment portion 5a of the auxiliary machinery bracket 5 from a side where the recess portion 5d is provided towards the outside of the auxiliary machinery bracket 5 along the direction Y2, and a third penetration portion 304c penetrating through the recess portion 302d at a lower side (i.e., at the side Z2) of the first penetration portion 304a in a state where the auxiliary machinery bracket 5 is assembled on the cylinder block 302. The separator portion 306 is accommodated within the void portion 304 in a state where the inlet portion 306a is inserted to the first penetration portion 304a, the outlet portion 306b is inserted to the second penetration portion 304b, and the oil passage portion 306d is inserted to the third penetration portion 304c. Accordingly, in the void portion 304, the separator portion 306 including a steric structure is configured so that an outer surface 306f is surrounded and covered by a clearance U formed by the air layer, except for the first, second, and third penetration portions 304a, 304b, 304c, and a portion in contact with the first passage portion 8a (the coolant flow passage 8). In addition, the temperature of the auxiliary machinery bracket 5 or the cylinder block 302 is restrained from being directly transmitted to the body portion 306c of the separator portion 306. The first passage portion 8a (the coolant flow passage 8) is disposed so as not to protrude into the separator portion 306. Thus, the separator structure may be provided at the inner void portion 304 of the separator portion 306 of which internal volume is secured without the influence of the arrangement of the first passage portion 8a (the coolant flow passage 8).

The inlet portion 306a and the oil passage portion 306d are attached to the first penetration portion 304a and the third penetration portion 304c via seal members 351 and 352 respectively. In this case, the seal member 351 seals the clearance U between a portion in the vicinity of the inlet portion 306a of the separator portion 306 and the cylinder block 302 (the recess portion 302d) while the seal member 352 seals the clearance U between a portion in the vicinity of the oil passage portion 306d and the cylinder block 302 (the recess portion 302d). The other configurations of the engine 300 in the third embodiment are substantially the same as the first embodiment.

In the third embodiment, the following effects are obtained.

In the third embodiment, the separator portion 306 including the cyclone system (centrifugal separation system) and serving as the separate member (individual member) from the cylinder block 302 and the auxiliary machinery bracket 5 is provided. Therefore, without consideration of which oil separation system is used for conducting the gas-liquid separation on blow-by gas, the separator portion 306 including the cyclone system (centrifugal separation system) and oil collection ability depending on design specifications of the engine 300 may be easily incorporated in the engine body 10.

In addition, in the third embodiment, the separator portion 306 includes the inlet portion 306a introducing blow-by gas from the cylinder block 302 and the oil passage portion 306d through which oil that is separated from blow-by gas at the body portion 306c flows. Then, the seal member 351 is provided to seal the clearance U between the portion in the vicinity of the inlet portion 306a and the cylinder block 302. The seal member 352 is also provided to seal the clearance U between the portion in the vicinity of the oil passage portion 306d and the cylinder block 302. Accordingly, a portion of blow-by gas introduced to the separator portion 306 is inhibited from being leaked, via the portions in the vicinity of the inlet portion 306a and the oil passage portion 306d, to the clearance U (i.e., the air layer in the void portion 304) that surrounds the outer surface 306f of the separator portion 306 from the outside and that is formed between the outer surface 306f, and the cylinder block 302 and the auxiliary machinery bracket 5. As a result, oil in blow-by gas is inhibited from being unnecessarily retained in the clearance U. The other effects of the third embodiment than the aforementioned effects are substantially the same as the first embodiment.

Figure 6:
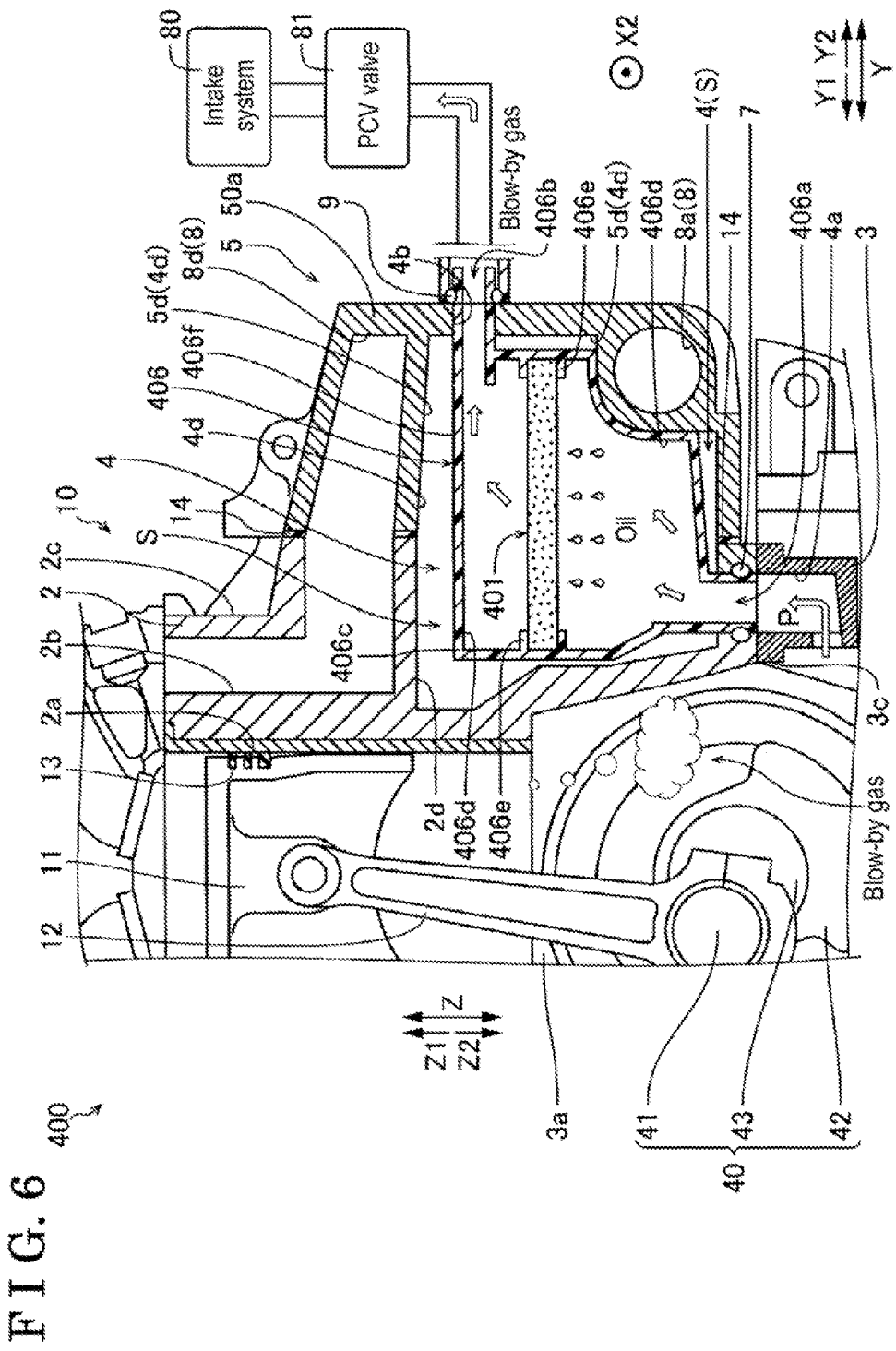
FIG. 6 is a cross-sectional view illustrating an inner structure of a separator portion in an engine viewed from a front side towards a rear side according to a fourth embodiment.

A fourth embodiment will be explained with reference to FIGS. 1, 2, and 6. In the fourth embodiment, being different from the separator portion 6 including the labyrinth structure in the first embodiment, a separator portion 406 including a filter system as the oil separation system is applied. In FIG. 6, configurations of the fourth embodiment substantially similar to the first embodiment bear the same reference numerals as the first embodiment.

In an engine 400 according to the fourth embodiment, as illustrated in FIG. 6, the auxiliary machinery bracket 5 is assembled on the side wall 2c of the cylinder block 2. The void portion 4 in the predetermined form is defined between the recess portion 2d of the side wall 2c and the recess portion 5d of the cylinder block attachment portion 5a. Then, the separator portion 406 serving as a separate member (individual member) from the cylinder block 2 and the auxiliary machinery bracket 5 is arranged in the void portion 4 formed between the cylinder block 2 and the auxiliary machinery bracket 5. The engine 400 serves as an example of the internal combustion engine.

In the fourth embodiment, the filter-type separator portion 406 is applied. The separator portion 406 includes an inlet portion 406a formed at a lower portion (i.e., at the side Z2), an outlet portion 406b formed at an upper portion (i.e., at the side Z1), and a body portion 406c formed between the inlet portion 406a and the outlet portion 406b. A filter member 401 is disposed in an inner void of the body portion 406c. The body portion 406c includes a fixation portion 406e circumferentially formed at an inner wall surface 406d to extend along the horizontal direction (i.e., the plane X-Y). An outer edge portion of the filter member 401 is fitted to the fixation portion 406e. The inlet portion 406a serves as an example of the inlet port.

Accordingly, blow-by gas flowing from the inlet portion 406a is collided against the filter member 401 in the upward direction (i.e., in the direction Z1) in the body portion 406c. In addition, in a case where blow-by gas passes through fine voids in the filter member 401, oil mist in fine particle form is adsorbed onto the filter member 401. Oil adsorbed onto the filter member 401 falls in liquid drop to return to the crankcase 3 (the oil storage portion 3b as illustrated in FIG. 1) via the inlet portion 406a. Blow-by gas where oil is separated by the gas-liquid separation by the filter member 401 is led to the PCV valve 81 to flow back to the intake system 80. The other configurations of the engine 400 in the fourth embodiment are substantially the same as the first embodiment.

In the fourth embodiment, the following effects are obtained.

In the fourth embodiment, the separator portion 406 including the filter system and serving as the separate member from the cylinder block 2 and the auxiliary machinery bracket 5 is provided. Therefore, without consideration of which oil separation system is used for conducting the gas-liquid separation on blow-by gas, the separator portion 406 including the filter system and oil collection ability depending on design specifications of the engine 400 may be easily incorporated in the engine body 10. The other effects of the fourth embodiment than the aforementioned effects are substantially the same as the first embodiment.

Figure 7:
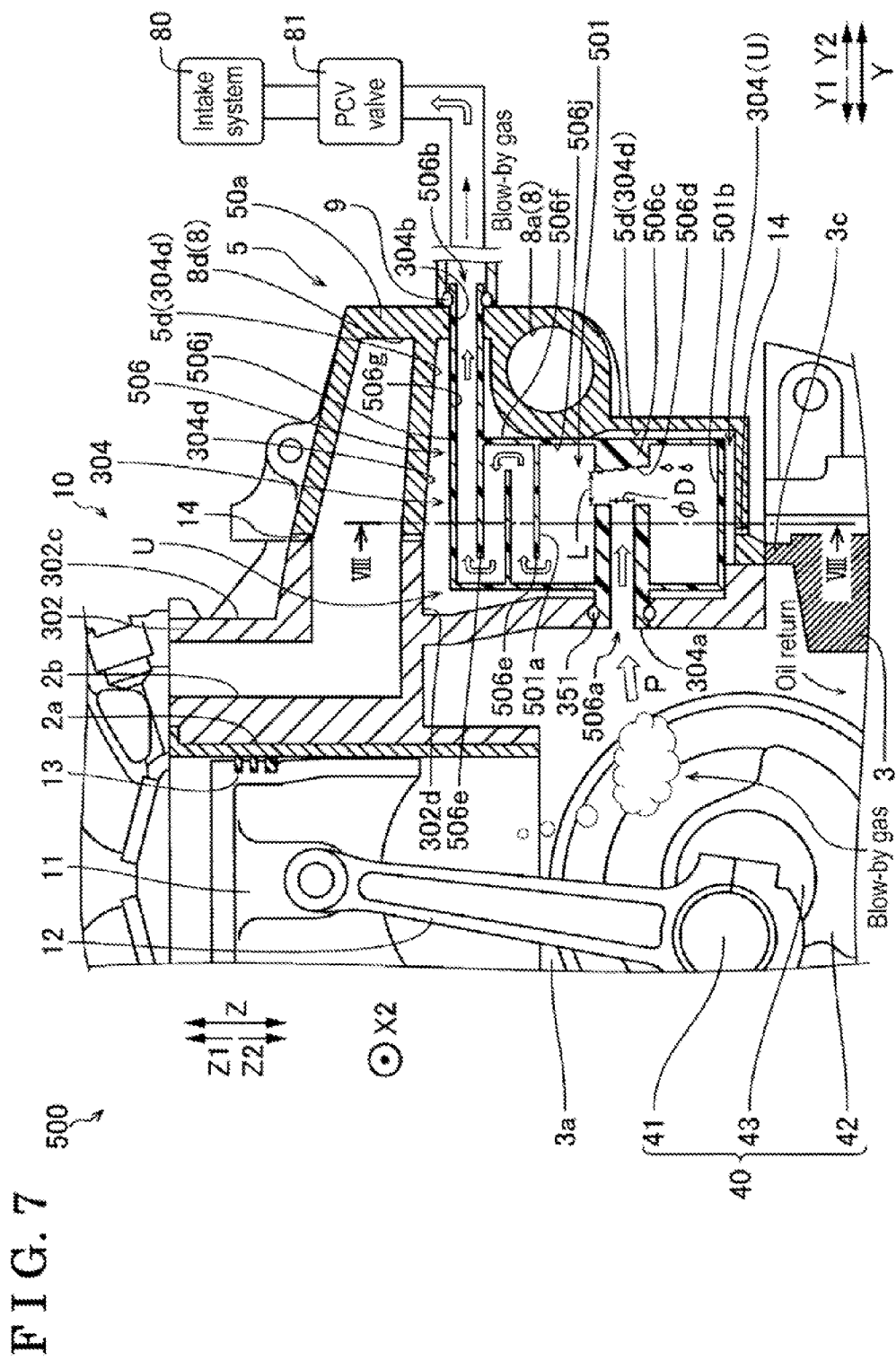
FIG. 7 is a cross-sectional view illustrating an inner structure of a separator portion in the engine viewed from a front side towards a rear side according to a fifth embodiment.
Figure 8:
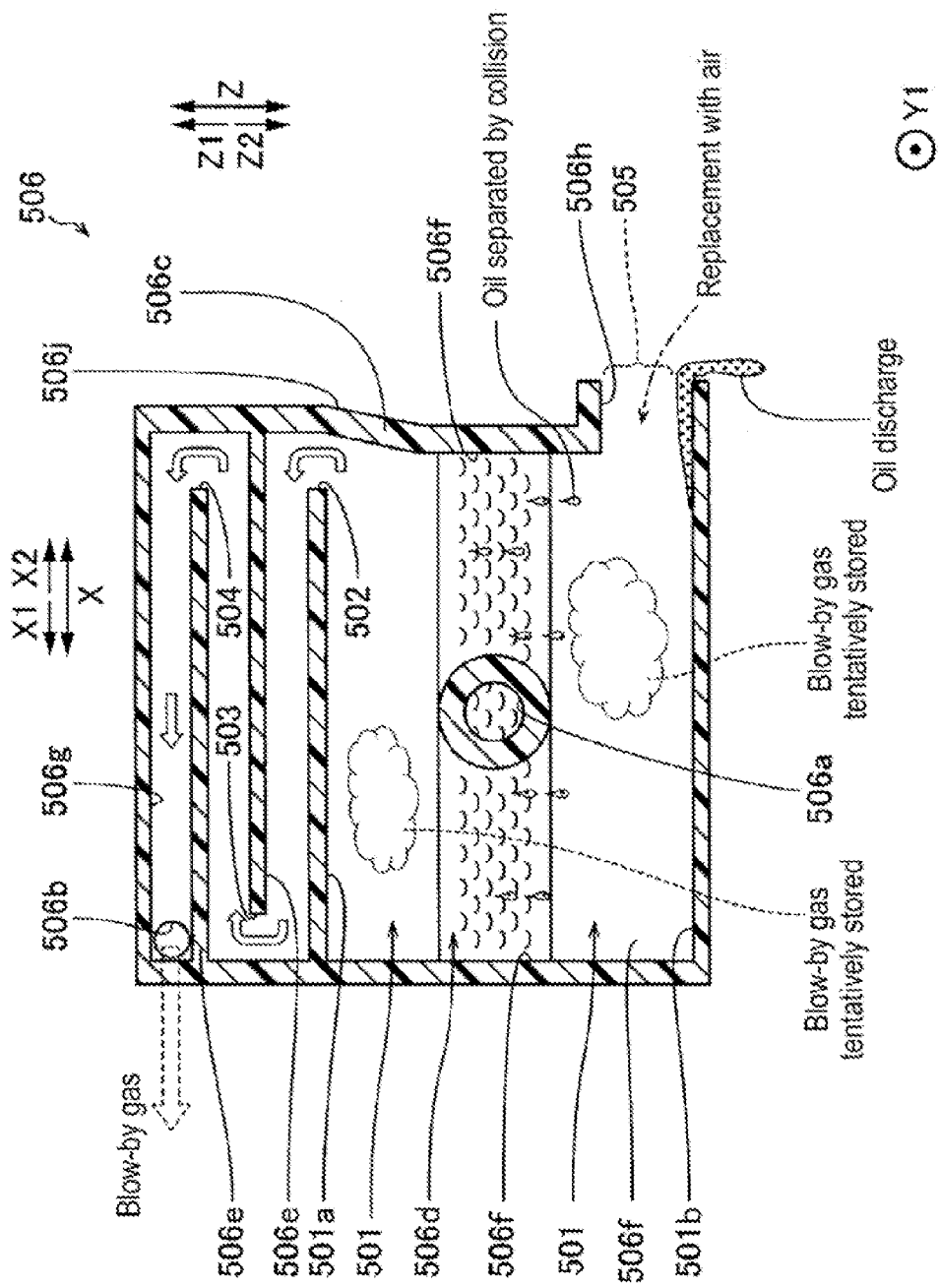
FIG. 8 is a cross-sectional view illustrating the inner structure of the separator portion taken along line VIII-VIII in FIG. 7 according to the fifth embodiment.
Figure 9:
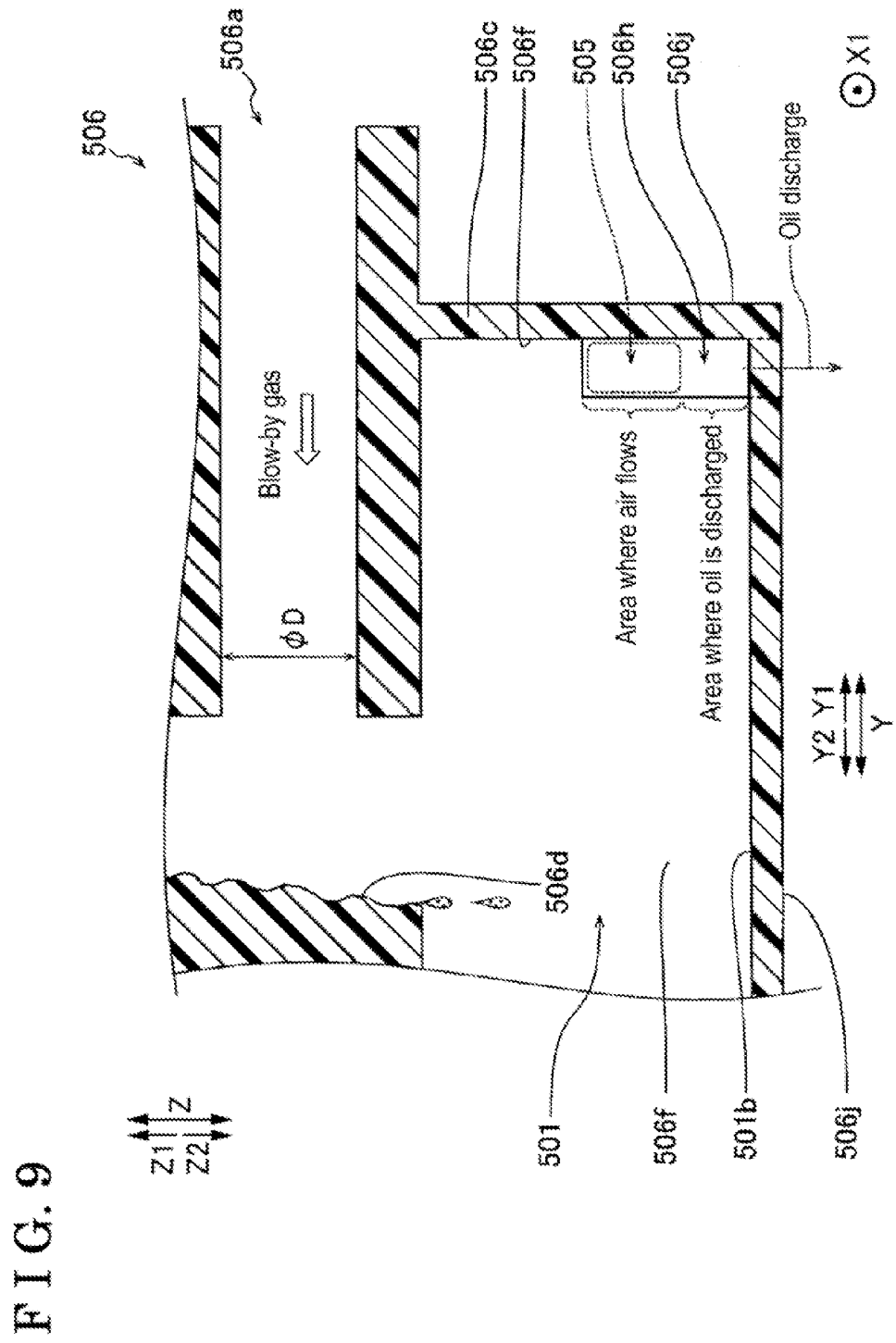
FIG. 9 is an enlarged view illustrating a configuration around an oil discharge port of the separator portion in the engine according to the fifth embodiment.

A fifth embodiment will be explained with reference to FIGS. 1, 5, 7 to 9. In the fifth embodiment, a separator portion 506 which is similar to the separator portion 6 in the first embodiment but of which separator function further improves than the separator portion 6 by modifying the internal configuration thereof is applied. In FIGS. 7 to 9, configurations of the fifth embodiment substantially similar to the first and third embodiments bear the same reference numerals as the first and third embodiments.

In an engine 500 according to the fifth embodiment, as a substitute for the cyclone-type separator portion 306 (see FIG. 5) applied in the engine 300 of the third embodiment, the separator portion 506 including the similar labyrinth structure to the separator portion 6 (see FIG. 2) in the first embodiment is disposed in the void portion 304 as illustrated in FIG. 7. The engine 500 serves as an example of the internal combustion engine.

In the fifth embodiment, the separator portion 506 includes an inlet portion 506a provided in the vicinity of a center portion in the up-down direction (i.e., in the direction Z), an outlet portion 506b provided at an upper portion (i.e., at the side Z1), and a body portion 506c including a predetermined internal configuration. The inlet portion 506a linearly extends (i.e., in a straight tube form) from the outside of the body portion 506c to the inside thereof so as to introduce blow-by gas from the crankcase 3 (the crank chamber 3a). The body portion 506c which is formed immediately behind the inlet portion 506a (i.e., at the side Y2 relative to the inlet portion 506a) includes a wall portion 506d against which blow-by gas introduced via the inlet portion 506a is configured to be collided and a storage void 501 formed immediately behind the wall portion 506d and storing blow-by gas after its collision against the wall portion 506d. The body portion 506c further includes plural projecting wall portions 506e which form the labyrinth structure and through which blow-by gas in the storage void 501 flows so as to configure the entire inner wall portion of the body portion 506c. The wall portion 506d facing the inlet portion 506a protrudes towards the inlet portion 506a further than an inner wall portion 506f formed at the side Y2 in the storage void 501 to extend in the up-down direction. The inlet portion 506a serves as an example of the inlet port.

The inlet portion 506a includes a circular cross-section with an inner diameter D as illustrated in FIG. 8. The wall portion 506d, which is not only provided at the position immediately behind the inlet portion 506a but also provided to extend in a band form to the inner wall portions 506f at opposed sides in the body portion 506c in the direction X (i.e., at the side X1 and the side X2) while maintaining the height position (in the direction Z). In addition, the wall portion 506d is formed to include an uneven surface including projections and recesses as illustrated in FIG. 7. In this case, the uneven surface may be in a mild wave form or in a more rugged form than the mild wave form. The size or magnitude of projections and recesses in the uneven surface may be uniform over the wall portion 506d or be irregular.

The surface of the wall portion 506d is inclined in a direction where blow-by gas collided against the wall portion 506d easily flows downward (i.e., in the arrow Z2 direction). Specifically, the surface of the wall portion 506d is inclined in a way that a separation distance (i.e., distance in the direction Y) from the inlet portion 506a (i.e., from a blow-by gas port) increases towards the lower side of the wall portion 506d. A horizontal distance L (a minimum value) from an end portion of the inlet portion 506a at the side Y2 to the surface of the wall portion 506d is greater than the inner diameter D of the inlet portion 506a.

Accordingly, blow-by gas introduced to the body portion 506c via the inlet portion 506a is sharply collided against the wall portion 506d. Because the wall portion 506d includes the uneven surface including projections and recesses, blow-by gas is collided against a larger area of the surface of the wall portion 506d. In addition, because the horizontal distance L is greater than the inner diameter D, some of oil mist (oil drops) in fine particle form contained in blow-by gas and including a relatively greater particle diameter are not only collided against the wall portion 506d but also fall by their own weight within a range of the horizontal distance L. Further, by the collision against the wall portion 506d, oil mist contained in blow-by gas is separated therefrom to some extent. Oil drops separated from blow-by gas fall along the surface of the wall portion 506d that is inclined downward.

Blow-by gas collided against the wall portion 506d and containing oil mist moves to the storage void 501. In this case, a flow speed of blow-by gas that spreads and diffuses in the storage void 501 decreases. FIG. 7 illustrates the storage void 501 that seems to be divided into two separate portions, i.e., one of the portions is formed at an upper side (i.e., at the side Z 1) than the inlet portion 506a and the other of the portions is formed at a lower side (i.e., at the side Z2) than the inlet portion 506a. In practice, however, as illustrated in FIG. 8, the storage void 501 serving as a single void is formed to surround a wall portion of the inlet portion 506a. FIG. 8 illustrates blow-by gas that diffuses to the portion at the upper side (at the side Z1) than the inlet portion 506a and to the portion at the lower side (at the side Z2) than the inlet portion 506a. Accordingly, oil mist is further separated from blow-by gas in a case where blow-by gas is retained at the upper side of the inlet portion 506a and the lower side of the inlet portion 506a.

As illustrated in FIGS. 7 and 8, the plural projecting wall portions (in the embodiment, two projecting wall portions) 506e are alternately disposed to form the labyrinth structure at a rear area (i.e., in a void at the side Z1) of a ceiling portion 501a of the storage void 501 at the upper side than the inlet portion 506a. In a planar view of the labyrinth structure of the separator portion 506 (i.e., in a case where the body portion 506c is viewed from the upper side), the ceiling portion 501a of the storage void 501, the two projecting wall portions 506e, and a ceiling portion 506g of the body portion 506c overlap one another while including predetermined intervals in the direction Z in a state to expand along the horizontal direction (i.e., on the plane X-Y). The flow passage of blow-by gas spreads to the rear side of the ceiling portion 501a of the storage void 501 via a slit portion 502 formed at the ceiling portion 501a of the storage void 501 and to a rear side of one of the projecting wall portions 506e positioned at the lower side (at the side Z2) (which will be hereinafter referred to as the lower projecting wall portion 506e) via a slit portion 503 formed at the lower projecting wall portion 506e. Then, the flow passage of blow-by gas spreads to a rear side of the other of the projecting wall portions 506e positioned at the upper side (at the side Z1) (which will be hereinafter referred to as the upper projecting wall portion 506e) via a slit portion 504 formed at the upper projecting wall portion 506e. The outlet portion 506b is obtained by a penetration bore formed at a corner area at the rear side (corresponding to the lower side of the ceiling portion 506g) of the upper projecting wall portion 506e.

Each of the ceiling portion 501a, the projecting wall portions 506e, and the ceiling portion 506g includes a substantially rectangular form in a planar view. The slit portion 502 is a continuous bore in an L-shape forming a clearance among side portions of the ceiling portion 501a at the side Y1 and the side X2 and the inner wall portion 506f of the body portion 506c. The slit portion 503 is also a continuous bore in an L-shape forming a clearance among side portions of the lower projecting wall portion 506e at the side Y2 and the side X1 and the inner wall portion 506f of the body portion 506c. The slit portion 504 is also a continuous bore in an L-shape forming a clearance among side portions of the upper projecting wall portion 506e at the side Y1 and the side X2 and the inner wall portion 506f of the body portion 506c. Specifically, the slit portions 502, 503 and 504 are alternately disposed at one side and the other side of a diagonal line connecting a corner portion at the side Y1 and the side X2 and a corner portion at the side Y2 and the side X 1 within the body portion 506c. Accordingly, blow-by gas tentatively retained in the storage void 501 flows in a reciprocating manner and a meander manner in the direction X and the direction Y to pass through the slit portions 502, 503 and 504 in the mentioned order in the upward direction to be led to the outlet portion 506b.

In the fifth embodiment, the separator portion 506 includes an oil discharge port 506h for discharging oil in blow-by gas (i.e., oil separated from blow-by gas) stored in the storage void 501. As illustrated in FIG. 8, the oil discharge port 506h is disposed in the vicinity of a bottom portion 501b Positioned at the side Z2 of the storage void 501 so as to open in the horizontal direction (in the direction X). The oil discharge port 506h in a vertically elongated form, i.e., elongated in the direction Z, is formed at a portion of the inner wall portion 506f at the side X2 extending in the up-down direction (in the direction Z) to open to the storage void 501. Accordingly, oil in liquid form separated from blow-by gas at the wall portion 506d and the storage void 501 to fall is appropriately discharged to the crankcase 3 (the oil storage portion 3b) via the oil discharge port 506h in the vertically elongated form. In this case, oil mainly flows through a lower portion (at the side Z2) of a cross-section area of the oil discharge port 506*h* in the vertically elongated form. A connection passage (i.e., a small bore portion 505 through which air mainly flows) connecting the storage void 501 and the crankcase 3 (the crank chamber 3*a*) is formed at an upper portion (at the side Z1) of the cross-section area of the oil discharge port 506*h* (an approximate region is indicated by broken lines in FIGS. 8 and 9). Accordingly, in the storage void 501, oil intended to be discharged to the oil storage portion 3*b* and air within the crank chamber 3*a* are immediately replaced with each other via the oil discharge port 506*h*, which facilitates immediate oil discharge. The first passage portion 8*a* (the coolant flow passage 8) is disposed so as not to protrude into the separator portion 506. Thus, the separator structure may be provided at the inner void portion 304 of the separator portion 506 of which internal volume is secured without the influence of the arrangement of the first passage portion 8*a* (the coolant flow passage 8).

As illustrated in FIG. 7, the conduit wall portion of the first passage portion 8*a* at the auxiliary machinery bracket 5 is disposed along an outer surface 506*j* of the separator portion 506 positioned at the side Z1 of the storage void 501, instead of being disposed at a height position (in the direction Z) facing the wall portion 506*d*. Accordingly, the storage void 501 in which blow-by gas is retained or stored is warmed or heated indirectly by coolant at a relatively high temperature. As a result, water vapor contained in blow-by gas which is immediately after collided against the wall portion 506*d* after flowing from the inlet portion 506*a* is unlikely to be condensed. In addition, further separation of oil mist from blow-by gas in the storage void 501 may be facilitated. The other configurations of the engine 500 in the fifth embodiment are substantially the same as the first embodiment.

In the fifth embodiment, the following effects are obtained.

In the fifth embodiment, the separator portion 506 is configured to include the inlet portion 506*a* introducing blow-by gas from the cylinder block 2, the wall portion 506*d* which is provided immediately behind the inlet portion 506*a* and against which blow-by gas introduced via the inlet portion 506*a* is collided, and the storage void 501 which is provided immediately behind the wall portion 506*d* and which stores or retains blow-by gas after its collision against the wall portion 506*d*. Accordingly, blow-by gas introduced into the body portion 506*c* via the inlet portion 506*a* is sharply collided against the wall portion 506*d* to effectively separate oil mist (oil drops) in fine particles contained in blow-by gas. The blow-by gas after its collision is diffused to the storage void 501 in the up-down direction and the flow speed of blow-by gas is reduced so that the blow-by gas is retained in the storage void 501, which leads to further separation of oil mist. The function of the separator portion 506 for separating oil may improve accordingly.

In addition, the oil discharge port 506*h* in the vertically elongated form in the up-down direction (in the direction Z) is provided at the separator portion 506 for discharging oil in blow-by gas that is retained or stored in the storage void 501. Thus, oil in liquid form separated from blow-by gas at the wall portion 506*d* and the storage void 501 drops and falls to be appropriately discharged to the crankcase 3 (the oil storage portion 3*b*) (i.e., discharged to the outside of the separator portion 506 to the inside of the cylinder block 2) via the oil discharge port 506*h* in the vertically elongated form. In this case, oil mainly flows out through the lower portion (at the side Z2) of the cross-section area of the oil discharge port 506*h*. On the other hand, the upper portion (at the side Z1) of the cross-section area of the oil discharge port 506*h* may form or include the connection passage (i.e., the small bore portion 505 through which air flows) connecting the storage void 501 and the crankcase 3 with each other. Thus, in the storage void 501, oil intended to be discharged to the crankcase 3 (the oil storage portion 3*b*) and air within the crankcase 3 are immediately replaced with each other via the oil discharge port 506*h*. As a result, oil in liquid form including viscosity may be immediately discharged from the oil discharge port 506*h*. The storage void 501 including a predetermined void capacity may be constantly secured because oil in liquid phase is inhibited from remaining in the storage void 501, thereby easily maintaining the function of the separator portion 506.

In the fifth embodiment, the wall portion 506*d* is configured to include the surface (uneven surface) including projections and recesses. Thus, blow-by gas may be collided against a larger area of the surface of the wall portion 506*d* corresponding to the unevenness (the projections and recesses) in the surface to thereby effectively collect and capture oil mist in fine particles contained in blow-by gas by the uneven surface including projections and recesses.

In addition, the wall portion 506*d* is configured to include the surface inclined in the direction in which blow-by gas that is collided against the wall portion 506*d* easily flows downward (in the arrow Z2 direction). Thus, blow-by gas after collided against the wall portion 506*d* is easily led to the storage void 501 formed at the lower side than the inlet portion 506*a*. Because blow-by gas is retained or stored from the lower side to the upper side in the storage void 501, blow-by gas may be retained or stored in the storage void 501 for a long period of time. As a result, oil mist may be sufficiently separated from blow-by gas in the storage void 501. The other effects of the fifth embodiment than the aforementioned effects are substantially the same as the first embodiment.

The embodiments are not limited to include the aforementioned configurations and may be appropriately changed or modified as follows.

For example, in the first to fifth embodiments, the separator portion 6, 206, 306, 406, 506 made of resin is disposed in the void portion 4, 204, 304 formed between the cylinder block 2, 202, 302 and the auxiliary machinery bracket 5. Alternatively, the separator portion 6, 206, 306, 406, 506 made of metallic may be disposed in the void portion 4, 204, 304 between the cylinder block 2, 202, 302 and the auxiliary machinery bracket 5. Even the metallic separator portion may be unlikely to receive an influence of the outside air temperature while being thermally insulated by means of the void portion 4, 204, 304 (the clearance S, T, U). The heat-retaining properties of the metallic separator portion are maintained to thereby inhibit condensation of water vapor in blow-by gas flowing through the separator portion.

In addition, in the first to fifth embodiments, the separator structure of the internal combustion engine is applied in a state where the auxiliary machinery bracket 5 to which the water pump 70, an alternator, and a compressor serving as the auxiliary machines are configured to be attached and the cylinder block 2, 202 302 are assembled on each other. That is, the auxiliary machinery bracket 5 serves as an exclusive member to which the auxiliary machines are attached. Alternatively, the separator structure of the internal combustion engine may be applied to the internal combustion engine in which a timing chain cover or a timing belt cover attached to the engine body 10 serves as the auxiliary machinery attachment member.

Further, in the first to fifth embodiments, the heat insulating layer formed by the air layer is provided at the clearance S, T, U between the outer surface 6f, 206f, 306f, 406f of the separator portion 6, 206, 306, 406, 506 and the inner wall surface 4d, 204d, 304d of the void portion 4, 204, 304. Alternatively, the heat insulating layer made of resin material may be used. For example, in a state where the separator portion 6, 206, 306, 406, 506 is fitted in the void portion 4, 204, 304, a foam type heat insulating material such as urethane resin may be filled in the clearance S, T, U. In this case, the foam type heat insulating material may be filled in a portion of the clearance S, T, U facing the auxiliary machinery bracket 5, or portions of the clearance S facing both the auxiliary machinery bracket 5 and the cylinder block 2, 202 302. Further alternatively, a fibrous heat insulating material such as glass wool, for example, may be filled in the clearance S, T, U. In a state where the body portion 6c, 206c, 306c, 406c, 506c (the outer surface 6f, 206f, 306f, 406f) of the separator portion 6, 206, 306, 406, 506 is covered or surrounded by a cover layer (heat insulating layer) made of the foam type heat insulating material or the fibrous heat insulating material, for example, the separator portion 6, 206, 306, 406, 506 may be fitted in the void portion 4. At this time, the air layer (the heat insulating layer) may be further disposed in a clearance between the separator portion 6, 206, 306, 406, 506 that is surrounded by the cover layer (heat insulating layer) made of the foam type heat insulating material or the fibrous heat insulating material, for example, and the auxiliary machinery bracket 5 (the cylinder block 2, 202 302).

In the first, second, and fifth embodiments, the labyrinth type separator portion 6, 206, 506 is applied as the separator structure. In the third embodiment, the cyclone type separator portion 306 is applied as the separator structure. In the fourth embodiment, the filter type separator portion 406 is applied as the separator structure. Alternatively, as the separator structure, the separator portion including other oil separation type than the aforementioned types may be applied. For example, the separator portion may be configured to include divided plural separator chambers where blow-by gas is acquired from one of the separator chambers while blow-by gas is discharged from another one of the plural separator chambers.

In the first, second, fourth and fifth embodiments, the conduit wall portion of the first passage portion 8a at the auxiliary machinery bracket 5 and the portion of the outer surface 6f, 206f, 406f of the body portion 6c, 206c, 406c, 506c of the separator potion 6, 206, 406, 506 facing the conduit wall portion are in contact with each other. Alternatively, a slight gap may be formed between the conduit wall portion of the first passage portion 8a and the outer surface 6f, 206f, 406f of the separator portion 6, 206, 406, 506. Accordingly, in a case where the engine 100, 200, 400, 500 is subject to an environment of low outside air temperature after the stop or in a case where the temperature of coolant flowing through the first passage portion 8a is not sufficiently raised at the start of (immediately after) the engine 100, 200, 400, 500, the temperature of the separator portion 6, 206, 406, 506 is restrained from decreasing.

In the fifth embodiment, the wall portion 506d is configured to include the uneven surface including projections and recesses. Alternatively, the wall portion 506d may include a flat surface.

In addition, in the fifth embodiment, the single inlet portion 506a is provided at the separator portion 506. Alternatively, the separator portion 506 may be configured to include plural inlet portions 506a that are arranged in front of the wall portion 506d against which blow-by gas is collided. In addition, the inlet portion 506a may be configured to include a polygon cross section instead of a circular cross section. In the engine 500, the void portion 304 (the clearance U) around the separator portion 506 may be connected to the crank chamber 3a (i.e., corresponding to the configuration of the void portion 204 in the second embodiment).

In the fifth embodiment, the inlet portion 506a that includes the inner diameter D is formed to linearly (in the straight tube form) extend. Alternatively, in order to cause blow-by gas that is pulled or taken to the body portion 506c to be effectively collided against the wall portion 506d, the inner diameter of the inlet portion 506a may vary.

In the first to fifth embodiments, the engine 100, 200, 300, 400, 500 for automobiles serving as the gasoline engine may be applied. Alternatively, the engine 100, 200, 300, 400, 500 formed by a gas engine other than the gasoline engine (i.e., the internal combustion engine such as a diesel engine and a gas engine, for example) may be applied. Further alternatively, the internal combustion engine mounted as a drive source (power source) for equipment other than automobiles may be applied.

According to the aforementioned embodiments, the internal combustion engine and the separator structure thereof that avoid dew condensation water from being mixed into oil recovered from the separator portion 6, 206, 306, 406, 506 may be provided by effectively inhibit condensation of water vapor in blow-by gas flowing through the separator portion 6, 206, 306, 406, 506.

According to the first to fifth embodiments, the separator portion 6, 206, 306, 406, 506 serving as the separate member from the cylinder block 2, 202, 302 and the auxiliary machinery bracket 5 may be thermally isolated from the cylinder block 2, 202, 302 and the auxiliary machinery bracket 5 which are directly disposed to outside air in a state where a clearance portion between the separator portion 6, 206, 306, 406, 506 and each of the cylinder block 2, 202, 302 and the auxiliary machinery bracket 5 is utilized as the heat insulating layer. That is, the separator portion 6, 206, 306, 406, 506 is thermally insulated by means of the aforementioned clearance portion (the heat insulating layer) so that the separator portion 6, 206, 306, 406, 506 is unlikely to be directly influenced by an outside air temperature. The temperature of the separator portion 6, 206, 306, 406, 506 is restrained from decreasing in a case where the internal combustion engine 100, 200, 300, 400, 500 is disposed under a low temperature environment after the stop and in a case where a coolant temperature of the internal combustion engine 100, 200, 300, 400, 500 is not sufficiently raised after (immediately after) the start thereof, for example. Accordingly, heat retaining properties of the separator portion 6, 206, 306, 406, 506 are maintained to effectively inhibit condensation of water vapor contained in blow-by gas flowing through the separator portion 6, 206, 306, 406, 506. Consequently, due condensation water is inhibited from being mixed into oil that is recovered by the separator portion 6, 206, 306, 406, 506.

In addition, the separator portion 6, 206, 306, 406, 506 serving as the separate member from the cylinder block 2, 202, 302 and the auxiliary machinery bracket 5 may be incorporated in the internal combustion engine 100, 200, 300, 400, 500 without consideration of which oil separation system (for example, an inertial collision system, a labyrinth system, a cyclone system, and a filter system) is used for conducting the gas-liquid separation on blow-by gas. Depending on design specifications of the internal combustion engine 100, 200, 300, 400, 500, oil collection ability required for the separator portion 6, 206, 306, 406, 506 (features of the separator portion 6, 206, 306, 406, 506 in view of design specifications) is different. Nevertheless, even in a case where the separator portion 6, 206, 306, 406, 506 including any oil separation system is applied, inhibition of dew condensation of water vapor in blow-by gas is effectively achieved by heat-retention of the separator portion 6, 206, 306, 406, 506, thereby avoiding dew condensation water from being mixed into oil separated and obtained by the gas-liquid separation. Thus, high usefulness of the internal combustion engine 100, 200, 300, 400, 500 is obtained.

In the first to fifth embodiments, the separator portion 6, 206, 306, 406, 506 is disposed in the void portion 4, 204, 304 between the cylinder block 2, 202, 302 and the auxiliary machinery bracket 5 in a state where the clearance S, T, U is formed relative to at least the auxiliary machinery bracket 5.

The separator portion 6, 206, 306, 406, 506 is arranged in the void portion 4, 204, 304 in a state to have the clearance relative to the auxiliary machinery bracket 5 that does not include a heat source or the like and that may easily directly receive an influence of the outside air temperature. Thus, even in a state where the auxiliary machinery bracket 5 is cooled by the outside air, the clearance S, T, U functions as the heat insulating layer to inhibit the temperature of the auxiliary machinery bracket 5 from being directly thermally transmitted to the separator portion 6, 206, 306, 406, 506 in the void portion 4, 204, 304. Because the heat retaining properties of the separator portion 6, 206, 306, 406, 506 relative to the outside air temperature are effectively maintained, dew condensation of water vapor in blow-by gas that flows through the separator portion 6, 206, 306, 406, 506 resulting from the outside air temperature may be securely inhibited.

In addition, in the first to fifth embodiments, the separator portion 6, 206, 306, 406, 506 is disposed in the void portion 4, 204, 304 between the cylinder block 2, 202, 302 and the auxiliary machinery bracket 5 in a state where the clearance S, T, U is formed relative to both the cylinder block 2, 202, 302 and the auxiliary machinery bracket 5.

The separator portion 6, 206, 306, 406, 506 is arranged in a state to have the clearance S, T, U not only relative to the auxiliary machinery bracket 5 that is easily influenced by the outside air temperature but also relative to the cylinder block 2, 202, 302. Thus, even in a low-temperature state where the temperature of coolant of the internal combustion engine 100, 200, 300, 400, 500 is not heated to a predetermined temperature at the start of the internal combustion engine 100, 200, 300, 400, 500, for example, heat insulation effect (heat insulation ability) is obtained by the clearance S, T, U defined between the separator portion 6, 206, 306, 406, 506 and each of the auxiliary machinery bracket 5 and the cylinder block 2, 202, 302 to thereby secure heat-retention of the separation portion 6, 206, 306, 406, 506 in the void portion 4, 204, 304. Specifically, dew condensation of water vapor in blow-by gas flowing through the separator portion 6, 206, 306, 406, 506 immediately after cold start of the internal combustion engine 100, 200, 300, 400, 500 may be securely inhibited.

Further, in the first to fifth embodiments, the heat insulating layer is formed at the clearance S, T, U between the separator portion 6, 206, 306, 406, 506 and at least the auxiliary machinery bracket 5.

Thus, even in a state where the auxiliary machinery bracket 5 is cooled, the heat insulation effect (heat insulation ability) provided at the clearance S, T, U between the separator portion 6, 206, 306, 406, 506 and the auxiliary machinery bracket 5 is obtained relative to the auxiliary machinery bracket 5 to thereby securely maintain heat in the separator portion 6, 206, 306, 406, 506.

Furthermore, in the first to fifth embodiments, the heat insulating layer includes the air layer.

Accordingly, the heat insulation ability may be easily exerted at the clearance S, T, U between the separator portion 6, 206, 306, 406, 506 and at least the auxiliary machinery bracket 5 by the usage of the air layer as the heat insulating layer, without a usage of special material for exerting the heat insulation effect (heat insulation ability).

In the first, second, and fifth embodiments, the separator portion 6, 206, 506 is configured to include the labyrinth structure at the inner portion.

Because of the labyrinth structure at the inner portion of the separator portion 6, 206, 506, oil mist in fine particle form contained in blow-by gas may be effectively collected and captured by retention of blow-by gas at the inner void of the separator portion 6, 206, 506 where the flow passage length thereof is elongated. In a case where the labyrinth type separator portion 6, 206, 506 is applied, blow-by gas is inhibited from being cooled so as to effectively inhibit dew condensation of water vapor in blow-by gas flowing through the separator portion 6, 206, 506.

In the first, third, fourth, and fifth embodiments, the separator portion 6, 306, 406, 506 includes the inlet portion 6a, 306a, 406a, 506a for introducing blow-by gas from the cylinder block 2, 302, and the seal member 7, 351, 352 is provided to seal the clearance S, U between the portion in the vicinity of the inlet portion 6a, 306a, 406a, 506a of the separator portion 6, 306, 406, 506 and the cylinder block 2, 302.

Accordingly, a portion of blow-by gas introduced to the separator portion 6, 306, 406, 506 is inhibited from being leaked via the portion in the vicinity of the inlet portion 6a, 306a, 406a, 506a to (i.e., inhibited from entering) the void portion 4, 304 (clearance S, U) that outwardly surrounds the separator portion 6, 306, 406, 506 and that is formed between the separator portion 6, 306, 406, 506 and each of the cylinder block 2, 302 and the auxiliary machinery bracket 5. As a result, oil in blow-by gas is inhibited from unnecessary entering to be retained in the void portion 4, 304 that outwardly surrounds the separator portion 6, 306, 406, 506 (the clearance S, U between the outer surface 6f, 306f, 406f of the separator portion 6, 306, 406, 506 and each of the cylinder block 2, 302 and the auxiliary machinery bracket 5).

In the second embodiment, the separator portion 206 is disposed in a state where the clearance T that constitutes the heat insulating layer including the air layer is formed between the separator portion 206 and each of the cylinder block 202 and the auxiliary machinery bracket 5, and the heat insulating layer including the air layer is connected to the inner portion of the cylinder block 202.

Accordingly, the separator portion 206 arranged in the void portion 204 between the auxiliary machinery bracket 5 and the cylinder block 202 may be surrounded by the heat insulating layer (air layer) in communication with the inner portion of the cylinder block 202. In this case, gas at the inner portion of the cylinder block 202 is warmed or heated by blow-by gas or engine oil that is stored at the oil storage portion 3b, for example. Thus, the separator portion 206 is surrounded by such gas at a high temperature. The heat retaining properties of the separator portion 206 may be easily secured after the start of the internal combustion engine 200.

In the first to fifth embodiments, the auxiliary machinery bracket 5 includes the first passage portion 8a (the coolant flow passage 8), and the separator portion 6, 206, 306, 406, 506 is disposed in the vicinity of the first passage portion 8a (the coolant flow passage 8) of the auxiliary machinery bracket 5.

Accordingly, after the start of the internal combustion engine 100, 200, 300, 400, 500, heat of coolant (high-temperature water) sufficiently heated by the internal combustion engine 100, 200, 300, 400, 500 is transmitted to the separator portion 6, 206, 306, 406, 506 (the inner void of the separator portion 6, 206, 306, 406, 506) to warm or heat the separation portion 6, 206, 306, 406, 506. After once the separator portion 6, 206, 306, 406, 506 is heated by heat of coolant, the heat retaining properties of the separator portion 6, 206, 306, 406, 506 disposed in the void portion 4, 204, 304 between the cylinder block 2, 202, 302 and the auxiliary machinery bracket 5 are maintained. Thus, blow-by gas flowing through the separator portion 6, 206, 306, 406, 506 may be maintained at a predetermined temperature even in a case where the auxiliary machinery bracket 5 is exposed to a low-temperature outside air.

In the third and fifth embodiments, the first passage portion 8a (the coolant flow passage 8) is disposed in a state to be inhibited from protruding into the separator portion 306, 506.

Accordingly, the first passage portion 8a (the coolant flow passage 8) is disposed, without protruding into the inner void of the separator portion 306, 506, in the vicinity of the outer side of the separator portion 306, 506 (the inner void). Without an influence of arrangement of the first passage portion 8a (the coolant flow passage 8), the internal volume is sufficiently secured at the inner void of the separator portion 306, 506.

In the fifth embodiment, the separator portion 506 includes the inlet portion 506a for introducing blow-by gas from the cylinder block 302, the wall portion 506d which is provided immediately behind the inlet portion 506a and against which blow-by gas introduced via the inlet portion 506a is collided, and the storage void 501 provided immediately behind the wall portion 506d to store blow-by gas that is collided against the wall portion 506d.

Accordingly, blow-by gas introduced into the separator portion 506 via the inlet portion 506a is sharply collided against the wall portion 506d to effectively separate oil mist (oil drops) in fine particles contained in blow-by gas. The blow-by gas after its collision is diffused to the storage void 501 in the up-down direction and a flow speed of blow-by gas is reduced so that the blow-by gas is retained in the storage void 501, which leads to further separation of oil mist. The function of the separator portion 506 for separating oil may improve accordingly.

In the fifth embodiment, the separator portion 506 includes the oil discharge port 506h in a vertically elongated form extending in an up-down direction to discharge oil in blow-by gas that is stored in the storage void 501.

Thus, oil in liquid form separated from blow-by gas at the wall portion 506d and the storage void 501 drops and falls to be appropriately discharged to the outside of the separator portion 506 (i.e., inside of the cylinder block 302) via the oil discharge port 506h in the vertically elongated form. In this case, oil mainly flows out through a lower portion of a cross-section area of the oil discharge port 506h. On the other hand, an upper portion of the cross-section area of the oil discharge port 506h may form or include the connection passage (the small bore portion 505 through which air flows) connecting the storage void 501 and the outside of the separator portion 506 (the inside of the cylinder block 302) with each other. Thus, in the storage void 501, oil intended to be discharged and air within the cylinder block 302 are immediately replaced with each other via the oil discharge port 506h. As a result, oil in liquid form including viscosity may be immediately discharged from the oil discharge port 506h. The storage void 501 including a predetermined void capacity may be constantly secured because oil in liquid phase is inhibited from remaining in the storage void 501, thereby easily maintaining the function of the separator portion 506.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An internal combustion engine comprising:
   a cylinder block;
   an auxiliary machinery attachment member including a coolant flow passage and being arranged at a side wall of the cylinder block, the auxiliary machinery attachment member to which an auxiliary machine is attached; and
   a separator portion disposed in a void between the cylinder block and the auxiliary machinery attachment member in a vicinity of the coolant flow passage such that at least a portion of an outer surface of the coolant flow passage is in contact with the separator portion, the separator portion being provided as a separate member from the cylinder block and the auxiliary machinery attachment member to perform gas-liquid separation on blow-by gas.

2. The internal combustion engine according to claim 1, wherein the separator portion is disposed in the void between the cylinder block and the auxiliary machinery attachment member in a state where a clearance is formed relative to at least the auxiliary machinery attachment member.

3. The internal combustion engine according to claim 2, wherein the separator portion is disposed in the void between the cylinder block and the auxiliary machinery attachment member in a state where the clearance is formed relative to both the cylinder block and the auxiliary machinery attachment member.

4. The internal combustion engine according to claim 2, wherein a heat insulating layer is formed at the clearance between the separator portion and at least the auxiliary machinery attachment member.

5. The internal combustion engine according to claim 4, wherein the heat insulating layer includes an air layer.

6. The internal combustion engine according to claim 1, wherein the separator portion is configured to include a labyrinth structure at an inner portion.

7. The internal combustion engine according to claim 1, wherein the separator portion includes an inlet port for introducing blow-by gas from the cylinder block, and a seal member is provided to seal a clearance between a portion in a vicinity of the inlet port of the separator portion and the cylinder block.

8. The internal combustion engine according to claim 1, wherein the separator portion is disposed in a state where a clearance that constitutes a heat insulating layer including an air layer is formed between the separator portion and each of the cylinder block and the auxiliary machinery attachment member, and the heat insulating layer including the air layer is connected to an inner portion of the cylinder block.

9. The internal combustion engine according to claim 1, wherein the coolant flow passage is disposed in a state to be inhibited from protruding into the separator portion.

10. The internal combustion engine according to claim 1, wherein the separator portion includes an inlet port for introducing blow-by gas from the cylinder block, a wall portion which is provided immediately behind the inlet port and against which blow-by gas introduced via the inlet port is collided, and a storage void provided immediately behind the wall portion to store blow-by gas that is collided against the wall portion.

11. The internal combustion engine according to claim 10, wherein the separator portion includes an oil discharge port in a vertically elongated form extending in an up-down direction to discharge oil in blow-by gas that is stored in the storage void.

12. A separator structure of an internal combustion engine comprising:
   a separator portion disposed in a void between a cylinder block and an auxiliary machinery attachment member, said auxiliary machinery attachment member including a coolant flow passage and being arranged at a side surface of the cylinder block and to which an auxiliary machine is attached, said separator portion being disposed in a vicinity of the coolant flow passage such that at least a portion of an outer surface of the coolant flow passage is in contact with the separator portion, the separator portion being provided as a separate member from the cylinder block and the auxiliary machinery attachment member to perform gas-liquid separation on blow-by gas.

* * * * *